United States Patent
Morita

(10) Patent No.: US 8,371,974 B2
(45) Date of Patent: Feb. 12, 2013

(54) CHAIN TENSION STRUCTURE

(75) Inventor: Kenji Morita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1250 days.

(21) Appl. No.: 11/053,429

(22) Filed: Feb. 9, 2005

(65) Prior Publication Data

US 2005/0176538 A1  Aug. 11, 2005

(30) Foreign Application Priority Data

Feb. 10, 2004 (JP) ................................. 2004-034085
Feb. 10, 2004 (JP) ................................. 2004-034152

(51) Int. Cl.
*F16H 7/12* (2006.01)
(52) U.S. Cl. ........................................ 474/136; 280/261
(58) Field of Classification Search ............... 474/136; 280/261, 274, 281.1
See application file for complete search history.

(56) References Cited

U.S. PATENT DOCUMENTS

| | | | | |
|---|---|---|---|---|
| 885,982 A * | 4/1908 | Delacroix | | 474/136 |
| 1,357,540 A * | 11/1920 | Byrns | | 474/136 |
| 3,880,449 A * | 4/1975 | Wada | | 280/261 |
| 3,995,875 A * | 12/1976 | Wada | | 280/282 |
| 4,034,821 A * | 7/1977 | Stoddard et al. | | 180/227 |
| 4,598,920 A * | 7/1986 | Dutil et al. | | 280/236 |
| 4,787,648 A * | 11/1988 | Coetzee | | 280/275 |
| 5,011,459 A * | 4/1991 | Van De Vel | | 474/101 |
| 5,176,581 A * | 1/1993 | Kumm | | 474/110 |
| 5,244,439 A * | 9/1993 | Rogus | | 474/136 |
| 5,282,517 A * | 2/1994 | Prince | | 180/227 |
| 5,486,143 A * | 1/1996 | Ashby | | 474/148 |
| 5,679,084 A * | 10/1997 | Daniels, III | | 474/140 |
| 5,725,450 A * | 3/1998 | Huskey | | 474/116 |
| 6,029,990 A * | 2/2000 | Busby | | 280/261 |
| 6,039,664 A * | 3/2000 | Schmid | | 474/135 |
| 6,764,089 B2 * | 7/2004 | Drymalski | | 280/246 |
| 6,948,730 B2 * | 9/2005 | Morita et al. | | 280/260 |
| 7,059,983 B2 * | 6/2006 | Heim | | 474/80 |
| 7,153,229 B2 * | 12/2006 | Matsumoto et al. | | 474/144 |

(Continued)

FOREIGN PATENT DOCUMENTS

CN  2120077 U  10/1992
DE  821876  7/1895

(Continued)

OTHER PUBLICATIONS

U.S. Appl. No, 11/052,896, filed Feb. 9, 2005.

(Continued)

*Primary Examiner* — Robert A Siconolfi
*Assistant Examiner* — James Hsiao
(74) *Attorney, Agent, or Firm* — Birch, Stewart, Kolasch & Birch, LLP

(57) ABSTRACT

To facilitate a tension adjusting operation in the chain tension structure without changing a wheelbase of a vehicle. In the chain tension structure in which a chain is wound around a drive sprocket wheel which is arranged below a vehicle body frame and a driven sprocket wheel which is mounted on a rear wheel side and tension is imparted to the chain by a tension roller, the tension roller is mounted in a state that a hexagon socket head cap screw which constitutes a rotary shaft of the tension roller is inserted into an elongated hole which is opened in a plate-like projecting portion formed on the vehicle body frame.

9 Claims, 23 Drawing Sheets

U.S. PATENT DOCUMENTS

| | | | |
|---|---|---|---|
| 7,258,637 B2 * | 8/2007 | Thomasberg | 474/78 |
| 7,708,295 B2 * | 5/2010 | Wesling et al. | 280/260 |
| 2002/0160869 A1 * | 10/2002 | Barnett | 474/144 |
| 2004/0009835 A1 | 1/2004 | Heim | |
| 2005/0215367 A1 * | 9/2005 | Thomasberg | 474/78 |

FOREIGN PATENT DOCUMENTS

| | | |
|---|---|---|
| FR | 2370624 A | 9/1978 |
| GB | 191105126 A | 0/1911 |
| GB | 999654 A | 7/1965 |
| GB | 2243661 A | 11/1991 |
| GB | 191322581 A | 1/1994 |
| JP | 59-116640 A | 8/1984 |
| JP | 2-117991 U | 9/1990 |
| JP | 5-105179 A | 4/1993 |
| JP | 05105179 A | 4/1993 |
| JP | 11-257444 A | 9/1999 |

OTHER PUBLICATIONS

U.S. Appl. No. 11/053,926, filed Feb. 10, 2005.
U.S. Appl. No. 11/052,915, filed Feb. 9, 2005.
U.S. Appl. No. 11/052,866, filed Feb. 9, 2005.
U.S. Appl. No. 11/053,903, filed Feb. 10, 2005.
U.S. Appl. No. 11/052,863, filed Feb. 9, 2005.

* cited by examiner

US 8,371,974 B2

CHAIN TENSION STRUCTURE

CROSS-REFERENCE TO RELATED APPLICATIONS

The present application claims priority under 35 USC 119 to Japanese Patent Application Nos. 2004-034085 and 2004-034152 both filed on Feb. 10, 2004 the entire contents of which are hereby incorporated by reference.

BACKGROUND OF THE INVENTION

1. Field of the Invention

The present invention relates to a chain tension structure for imparting a tension to a chain which transmits a drive force.

2. Description of Background Art

A conventional chain tension structure is known wherein the chain tension structure is used for adjusting a tension of a chain by moving an axle of a rear wheel. See, for example, JP-A-5-105179.

FIG. 3(a) to FIG. 3(c) of JP-A-5-105179 are explained in conjunction with FIG. 22(a) to FIG. 22(c) of the drawings wherein the numerals have been renumbered.

FIG. 22(a) to FIG. 22(c) are explanatory views showing the conventional chain tension structure.

FIG. 22(a) is a cross-sectional view of one rear arm member 302 out of a pair of left and right rear arm members that vertically swingably supports a wheel by way of a rear axle 301 from a side. The rear arm member 302 includes an axle holder 303 for supporting the rear axle 301 on the inside thereof with an end portion of a bolt 304 mounted on the axle holder 303 which is allowed to penetrate a rear end of the rear arm member 302. A first nut 306 and a second nut 307 are threadedly engaged with an end portion of the bolt 304. A scale 308 is formed on a side surface of the axle holder 303 which is used as a reference for adjusting the position of the rear axle 301.

FIG. 22(b) is a lateral cross-sectional view of the rear arm member 302, wherein rear arm member 302 has a rectangular closed cross-sectional structure and the axle holder 303 is arranged on the inside of the rear arm member 302.

FIG. 22(c) is a view which observes a cross-section of the rear arm member 302 from above, wherein elongated holes 309, 309, which are formed in the longitudinal direction of the rear arm member 302 in an elongated manner, are provided on an outer wall and an inner wall of the rear arm member 302. The bolt-like rear axle 301 is allowed to penetrate the elongated hole 309 formed in the outer wall, an inner hole 311 formed in the axle holder 303, the elongated hole 309 formed in the inner wall and the wheel.

A sprocket is integrally mounted on the wheel and a chain is wound around the sprocket wheel.

To adjust a tension of the above-mentioned chain, a nut not shown in the drawing which is threadedly coupled to an end portion of the rear axle 301 is slackened, subsequently, the second nut 307 is slackened, and the first nut 306 is rotated. Due to such an operation, the rear axle 301 is moved together with the axle holder 303 along with the elongated holes 309, 309, and the axle-side sprocket wheel is also integrally moved with the rear axle 301 whereby the tension of the chain can be adjusted.

In the above-mentioned technique, since the rear axle 301 is moved to adjust the tension of the chain, a distance between an axle of another wheel (front wheel) of a bicycle and the rear axle 301 (that is, a wheelbase) is changed. Therefore, for example, a possibility exists wherein the turning performance of the bicycle is influenced.

Further, in addition to the adjustment of the rear axle 301 on the rear arm member 302 side, it is necessary to perform the adjustment of the rear axle 301 also on another rear arm member side in the same manner. Further, depending on the degree of tension of the chain, it may be necessary to repeat the adjustment on both rear arm members several times. Thus, the improvement of the adjusting operation can be enhanced.

In addition, a conventional drive force transmission unit structure for a vehicle, is known wherein the drive force transmission unit structure is provided with a freewheel, that is, a one-way clutch. See, for example, JP-UM-59-116640.

FIG. 1 of JP-UM-59-116640 is explained in conjunction with FIG. 24 of the drawings wherein the numerals have been renumbered.

FIG. 24 is a cross-sectional view showing the conventional drive force transmission unit structure of a vehicle, wherein a ratchet ring 303 is rotatably mounted on a body 301 of the freewheel by way of a plurality of steel balls 302. In addition, ratchet pawls 304 are raised tiltably in the substantially radial direction from an inner peripheral surface of the ratchet ring 303 to an outer peripheral surface of the body 301 of the freewheel so as to engage distal ends of the ratchet pawls 304 with ratchet teeth which are mounted on the outer peripheral surface of the body 301 of the freewheel thus connecting the sprocket wheel 306 to the ratchet ring 303 by a thread coupling.

Due to such a construction, the rotation of the sprocket wheel 306 in one direction with respect to the body 301 of the freewheel is allowed, while the rotation of the sprocket wheel 306 in another direction with respect to the body 301 of the freewheel is prevented. More specifically, the body 301 of the freewheel and the sprocket wheel 306 are integrally rotated. A ball pusher 307 is threadedly coupled to the body 301 of the freewheel to support the steel balls 302.

When the vehicle, that is provided with the above-mentioned freewheel, is provided with a multi-stage transmission mechanism which mounts a plurality of sprocket wheels on the ratchet ring 303 besides the sprocket wheel 306, to perform the transmission, for changing the winding of the chain around the sprocket wheel 306 or other sprocket wheel, it is necessary to apply a load to the chain from a sideward direction in a state wherein the chain is rotated. Accordingly, when the chain is not rotated, the winding of the chain cannot be changed to respective sprocket wheels. Thus, the transmission cannot be performed.

When the above-mentioned freewheel is mounted on a rear wheel of a bicycle, that is, a drive wheel, the sprocket wheel 306 is rotated by pedaling by way of the chain and a drive force is transmitted to the ratchet ring 303 from the sprocket wheel 306 by way of the ratchet pawls 304. Thus, the rear wheel which is mounted on the ratchet ring 303 is rotated.

When a rider travels on a slope or the like using inertia of the bicycle while placing his/her feet on the pedals without pedaling, only the rear wheel is rotated and the chain is not rotated whereby the transmission is impossible.

Accordingly, by adopting a structure which integrally connects the ratchet ring 303 to the body 301 of the above-mentioned freewheel, when the bicycle travels with inertia, the body 301 of the freewheel and the sprocket wheel 306 are integrally rotated along with the rotation of the rear wheel, whereby the chain is also rotated thus allowing the transmission. However, since the drive force transmission unit such as the pedal side, the chain, the freewheel and the like is always directly connected, it is preferable to provide an overload prevention mechanism to cope with a case in which a large load is applied to the drive force transmission unit.

SUMMARY AND OBJECTS OF THE INVENTION

Accordingly, it is an object of the present invention to easily perform the adjustment operation without changing a wheelbase of a vehicle by improving the chain tension structure.

The present invention is directed to a chain tension structure in which a chain is wound around a drive sprocket wheel which is arranged below a vehicle body frame and a driven sprocket wheel which is mounted on a rear wheel side. Tension is thereby imparted to the chain by a tension roller, wherein the tension roller is mounted in a state wherein a rotary shaft thereof is inserted into an elongated hole which is opened in a bracket formed on the vehicle body frame.

By moving the rotary shaft of the tension roller along the elongated hole formed in the bracket, the tension roller position can be adjusted. Further, it is possible to perform the adjustment of the tension of the chain at one place.

The present invention provides a bracket which is arranged in front of a front end of the rear wheel and is formed on a rear surface of the vehicle body frame.

The bracket and the tension roller can be arranged close to the center of a vehicle body and, at the same time, in a relatively large space.

The present invention provides a chain that is pushed by the tension roller at a position below a slackening side of the chain.

By pushing the chain with the tension roller at the position below the slackened side of the chain, it is possible to effectively impart tension to the chain. Further, since the chain is pushed upwardly from below, a position of an intermediate portion of the chain is elevated.

According to the present invention, the tension roller position can be adjusted by moving the rotary shaft of the tension roller along the elongated hole of the bracket. Thus, the adjustment of the tension of the chain can be easily performed. In the conventional structure which provides an elongated hole for mounting an axle of a rear wheel in a rear end of a rear fork, when a tension of a chain is adjusted, a distance between a front wheel and the rear wheel is changed or it is necessary to adjust axle positions respectively at left and right sides of the rear fork. Compared to such a conventional structure, according to the present invention, the distance between the front wheel and the rear wheel is not changed. Thus, there is no possibility that the chain tension adjustment influences the traveling performance. Further, since the adjustment of the tension of the chain can be performed at one place, the chain tension adjustment operation can be simplified.

According to the present invention, the bracket and the tension roller can be arranged close to the center of the vehicle body. Thus, it is possible to concentrate a mass at a position close to the vehicle body center whereby the turning performance of the vehicle can be enhanced. Further, it is possible to arrange the tension roller in front of the rear wheel and, at the same time, in the relatively large space in the vicinity of the rear surface of the vehicle body frame whereby the chain tension adjusting operation using the tension roller can be easily performed.

According to the present invention, since the chain is pushed from a position below the slackened side thereof by the tension roller, it is possible to effectively impart the tension to the chain. Further, since the chain is pushed from below to above, the position of the intermediate portion of the chain is elevated whereby it is possible to ensure the ground height.

It is an object of the present invention to prevent an overload from acting on a drive force transmission unit while performing the transmission during inertia while the vehicle is being operated by improving the drive force transmission unit structure of the vehicle.

The present invention is directed to a drive force transmission unit structure of a vehicle in which a drive sprocket wheel is mounted on a support shaft, a hub is rotatably mounted on an axle of a drive wheel and a driven sprocket wheel is mounted on the hub by way of a first one-way clutch. A main chain is wound around the drive sprocket wheel and the driven sprocket wheel wherein a drive force from a step-on pedal is transmitted to the support shaft so as to rotate the drive wheel. A frictional member generates a frictional force that is interposed between the driven sprocket wheel and the hub and which is parallel to the first one-way clutch.

When a large load is not applied to the drive force transmission unit ranging from the pedal to the drive wheel, the driven sprocket wheel and the hub are integrally rotated due to the frictional force of the frictional member. When the vehicle travels with inertia, the rotation is transmitted from the drive wheel to the driven sprocket wheel so as to rotate the main chain.

When a load in the direction which rotates the main chain reversely is applied to the drive force transmission unit as a large load, the slipping is generated between the driven sprocket wheel and the frictional member or between the hub and the frictional member.

The present invention provides, between the pedal and the support shaft, a crankshaft which is driven by the pedal, a crankshaft-side sprocket wheel which is mounted on the crankshaft, a plurality of transmission sprocket wheels having different tooth numbers which are mounted on the support shaft, a sub chain which is wound around the crankshaft-side sprocket wheel and the transmission sprocket wheels, and a derailleur which moves the sub chain in a sideward direction for changing the winding of the sub chain to any one of transmission sprocket wheels. The crankshaft-side sprocket wheel is mounted on the crankshaft by way of a second one-way clutch.

Due to such a constitution, it is possible to perform the transmission using the transmission sprocket wheel, the sub chain and the derailleur. Further, since the crankshaft-side sprocket wheel is mounted on the crankshaft by way of the second one-way clutch, even when the sub chain is rotated in the normal direction, the pedal is not rotated.

The present invention provides a frictional member that is an O ring. The O ring is arranged in the axial direction of the axle and on one side of the first one-way clutch. A cap member covers a side surface of the hub and is arranged on another side of the first one-way clutch.

It is possible to seal both sides of the second one-way clutch with the O ring and the cap member.

In the present invention, when the large load is not applied to the drive force transmission unit, the driven sprocket wheel and the hub can be integrally rotated by the frictional force of the frictional member. Thus, when the vehicle travels with inertia, the transmission can be performed by rotating the chain.

When a large load is applied to the drive force transmission unit, the slipping is generated between the driven sprocket wheel and the frictional member or between the hub and the frictional member thus preventing an overload from acting on respective portions of the drive force transmission unit.

In the present invention, the transmission can be performed by the transmission sprocket wheel, the sub chain and the derailleur. At the same time, the crankshaft-side sprocket wheel is mounted on the crankshaft by way of the second one-way clutch. Accordingly, even when the sub chain is rotated, the pedals are not rotated. Thus, it is possible to stabilize the posture in a state wherein a rider places his or her feet on pedals during the inertia traveling of the vehicle.

In the present invention provides the O ring that is arranged in the axial direction of the axle and on one side of the first one-way clutch. The cap member is arranged in the axial direction of the axle and on another side of the first one-way clutch. Thus, it is possible to seal both sides of the first one-way clutch with the O ring and the cap member whereby it is possible to prevent the first one-way clutch from being covered with dusts, muddy water or the like.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The best mode for carrying out the present invention is explained hereinafter in conjunction with attached drawings.

Figure 1:
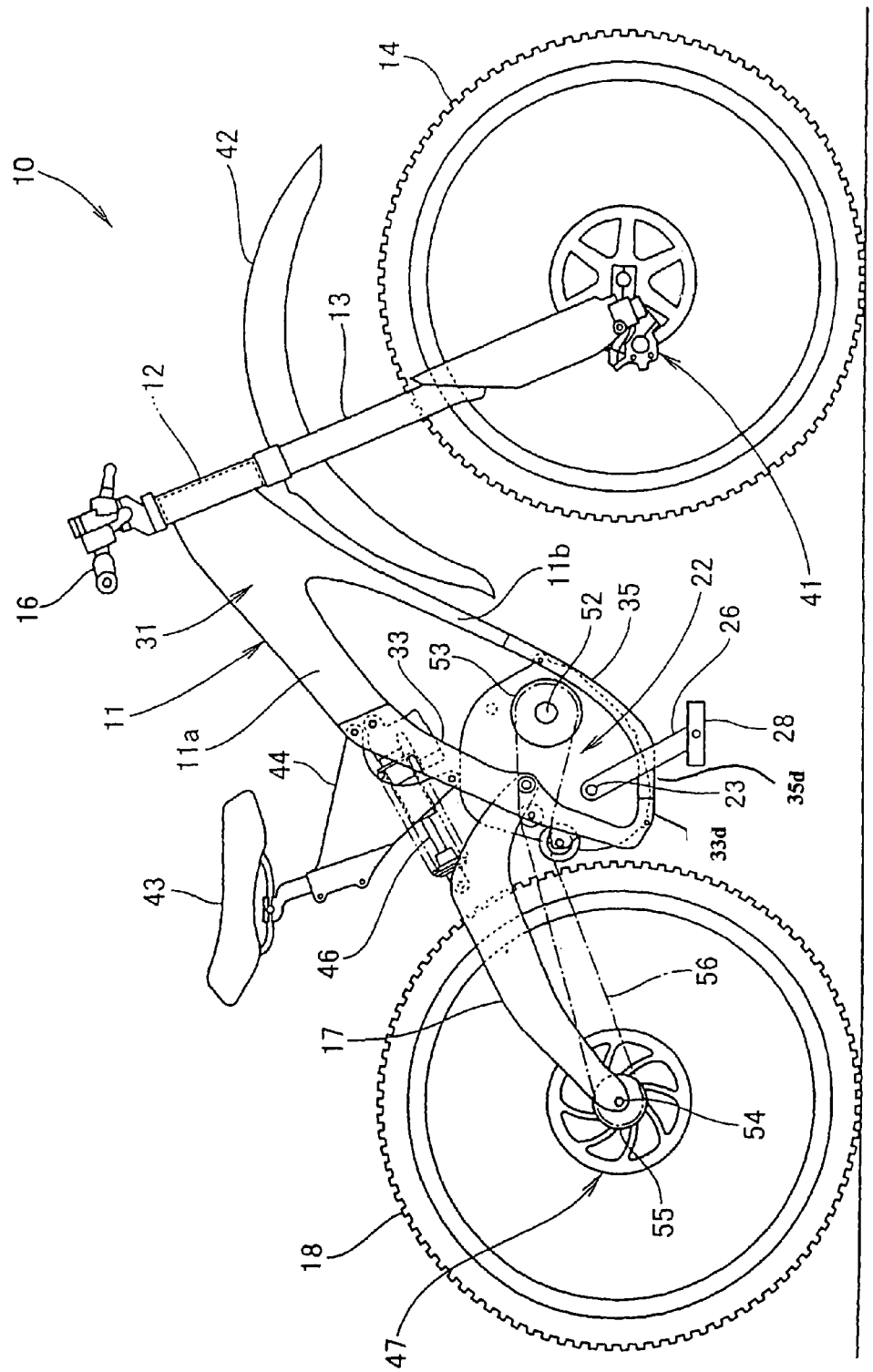
FIG. 1 is a side view of a vehicle which adopts the chain tension structure according to the present invention.

FIG. 1 is a side view of a vehicle which adopts a chain tension structure according to the present invention. A downhill bicycle 10 is used for the downhill competition wherein individuals compete for the time which is required for descending a course which is arranged in a woodland path, a skiing ground in the off-season, or the like. The downhill bicycle 10 includes a front fork 13 that is steerably mounted on a head pipe 12 which is provided to a front end of a vehicle body frame 11 with a front wheel 14 is mounted on a lower end of the front fork 13. A bar handle 16 is mounted on an upper portion of the front fork 13. A rear fork 17 is vertically swingably mounted on a rear portion of the vehicle body frame 11 with a rear wheel 18 mounted on a rear end of the rear fork 17. A transmission 22 is mounted on a lower portion of the vehicle body frame 11 for transmitting a drive force to the rear wheel 18. Left and right pedals 27, 28 (only the symbol 28 on a front side is shown in FIG. 1) are mounted on both ends of a crankshaft 23 which becomes an input shaft of the transmission 22, respectively, by way of left and right arms 24, 26 (only symbol 26 in a front side shown in FIG. 1).

The vehicle body frame 11 includes a main frame 31 which extends rearwardly, obliquely and downwardly from the head pipe 12. A rear portion thereof is formed in a Bifurcated manner into an upper extension portion 11a and a lower extension portion 11b. A pair of left and right rear frames 32, 33 are mounted on a rear end of the upper extension portion 11a (only the numeral 33 on a front side shown in FIG. 1). A pair of left and right lower frames 34, 35 are mounted in an extended manner between distal ends of the rear frames 32, 33 and a distal end of the lower extension portion 11b (only the numeral 35 on a front side shown in FIG. 1). Further, the upper extension portion 11a, lower extension portion 11b, rear frames 32, 33 and lower frames 34, 35 are connected in a loop shape, wherein the rear frames 32, 33 and the lower frames 34, 35 constitute members on which the transmission 22 is mounted. FIG. 1 illustrates the distal end 33d of rear frame 33 connected to the distal end 35d of lower frame 35.

A disk brake unit 41 is provided for the front wheel 14. A front fender 42 covers a position above the front wheel 14. A saddle 43 is provided which is mounted on the rear frames 32, 33 by way of a saddle frame 44 with a rear shock absorber unit 46 which extends between the rear end of the main frame 31 and an upper portion of the rear fork 17. A disk brake unit 47 is provided for the rear wheel 18.

Figure 2:
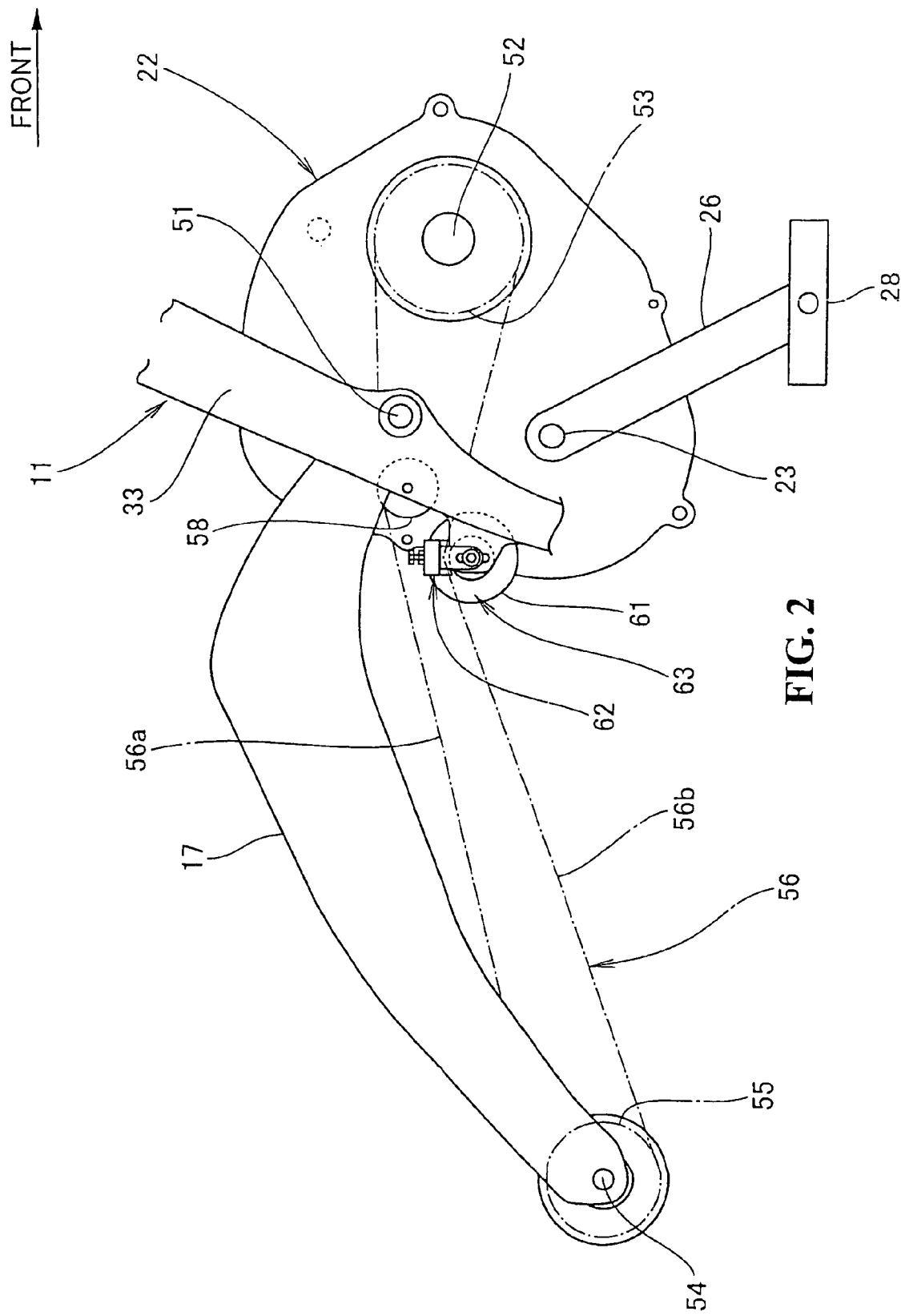
FIG. 2 is a side view of an essential part of the downhill bicycle according to the present invention.

FIG. 2 is a side view of an essential part of the downhill bicycle according to the present invention (an arrow (FRONT) in FIG. 2 indicates a front side of the vehicle. The same definition being applicable hereinafter), wherein the rear fork 17 is a member which is mounted on the rear frames 32, 33 (only the numeral 33 on a front side shown in FIG. 2) which constitutes the vehicle body frame 11 by way of a pivot shaft 51.

A drive sprocket wheel 53 is mounted on an output shaft 52 side provided to the transmission 22 and a driven sprocket wheel 55 is mounted on an axle 54 side of the rear wheel 18 (see FIG. 1) that are connected with each other by means of a chain 56 which is wound around the drive sprocket wheel 53 and driven sprocket wheel 55.

A roller 58 is provided which is rotatably mounted on the rear frame 33 in a state wherein the roller 58 is brought into contact with a tension side 56a of the chain 56 from below. A tension roller 61 is provided which is mounted on the rear frame 33 for tightening the chain 56 by bringing the tension roller 61 into contact with a slackened side 56b of the chain 56 from below. A tension roller moving mechanism 62 is provided which moves the tension roller 61 in the direction substantially orthogonal to the chain 56. A chain tension adjusting unit 63 is provided which includes the tension roller 61 and the tension roller moving mechanism 62.

Figure 3:
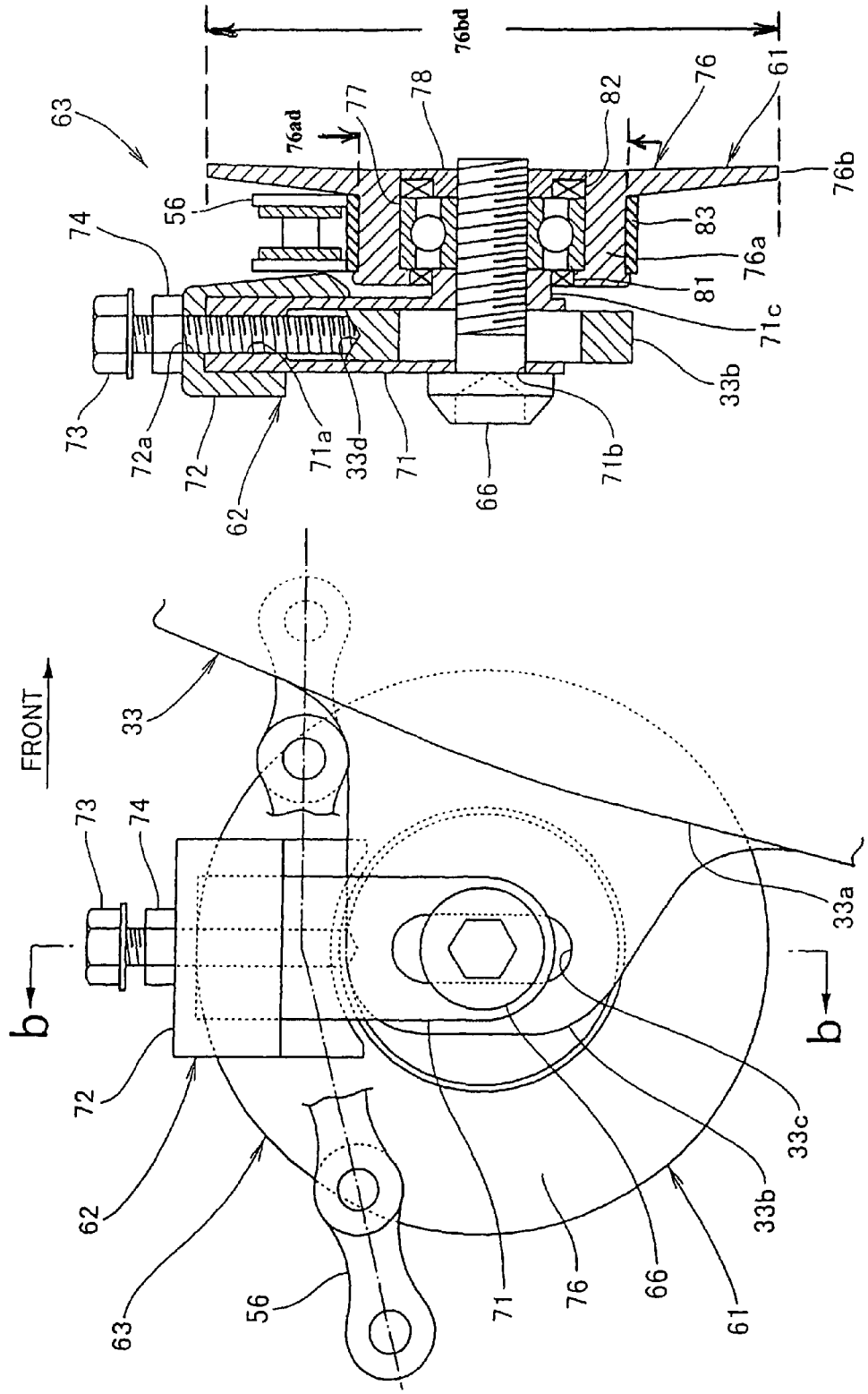
FIGS. 3(a) and 3(b) are explanatory views of a chain tension adjusting unit according to the present invention.

FIG. 3(a) and 3(b) are explanatory views of the chain tension adjusting unit according to the present invention.

FIG. 3(a) is a side view, wherein a plate-like projecting portion 33b is integrally formed on a rear surface 33a of the rear frame 33 with a longitudinally elongated hole 33c being is formed in the plate-like projecting portion 33b. A hexagonal socket head cap screw 66 is allowed to pass through the elongated hole 33c and the chain tension adjusting unit 63 is mounted on the plate-like projecting portion 33b.

The plate-like projecting portion 33b is a portion which is arranged in front of a front end of the rear wheel 18 (see FIG. 1). By arranging the plate-like projecting portion 33b at such a position, it is possible to arrange the chain tension adjusting unit 63 in a relatively large space of the downhill bicycle 10 (see FIG. 1).

FIG. 3(b) is a cross-sectional view taken along a line b-b in FIG. 3(a), wherein the tension roller moving mechanism 62 includes a mounting member 71 having a U-shaped cross-section which covers the plate-like projecting portion 33b, a restricting member 72 which restricts the movement of the chain 56 toward one side by covering the mounting member 71, an adjusting bolt 73, which is allowed to penetrate a bolt through hole 72a formed in the restricting member 72, is threaded into female threads 71a which are formed in an upper portion of the mounting member 71 and brings a distal end thereof into pressure contact with a recessed portion 33d which is formed in an upper end of the plate-like projecting portion 33b. A locking nut 74 is provided for stopping the rotation of the adjusting bolt 73. A hexagonal socket head cap screw 66 is allowed to pass through a bolt through hole 71b and a sleeve portion 71c formed in the mounting member 71.

The tension roller 61 includes a roller body 76 including a cylindrical portion 76a and a flange 76b which is formed on an end portion of the cylindrical portion 76a. Diameter 76bd of flange 76b is larger than diameter 76ad of cylindrical portion 76a. A bearing 77 is fitted on an inner peripheral surface of the roller body 76. A nut member 78 is threadedly coupled with the hexagonal socket head cap screw 66 with sealing members 81, 82 which are respectively arranged at both sides of the bearing 77. A cylindrical rubber 83 is fitted on an outer peripheral surface of the cylindrical portion 76a so as to resiliently support the chain 56. By sandwiching the bearing 77 between the sleeve portion 71c of the mounting member 71 and the nut member 78 and, at the same time, by threadedly engaging a distal end of the hexagonal socket head cap screw 66 which is allowed to penetrate the bearing 77 into the nut member 78, the tension roller 61 is mounted on the mounting member 71.

Figure 4:
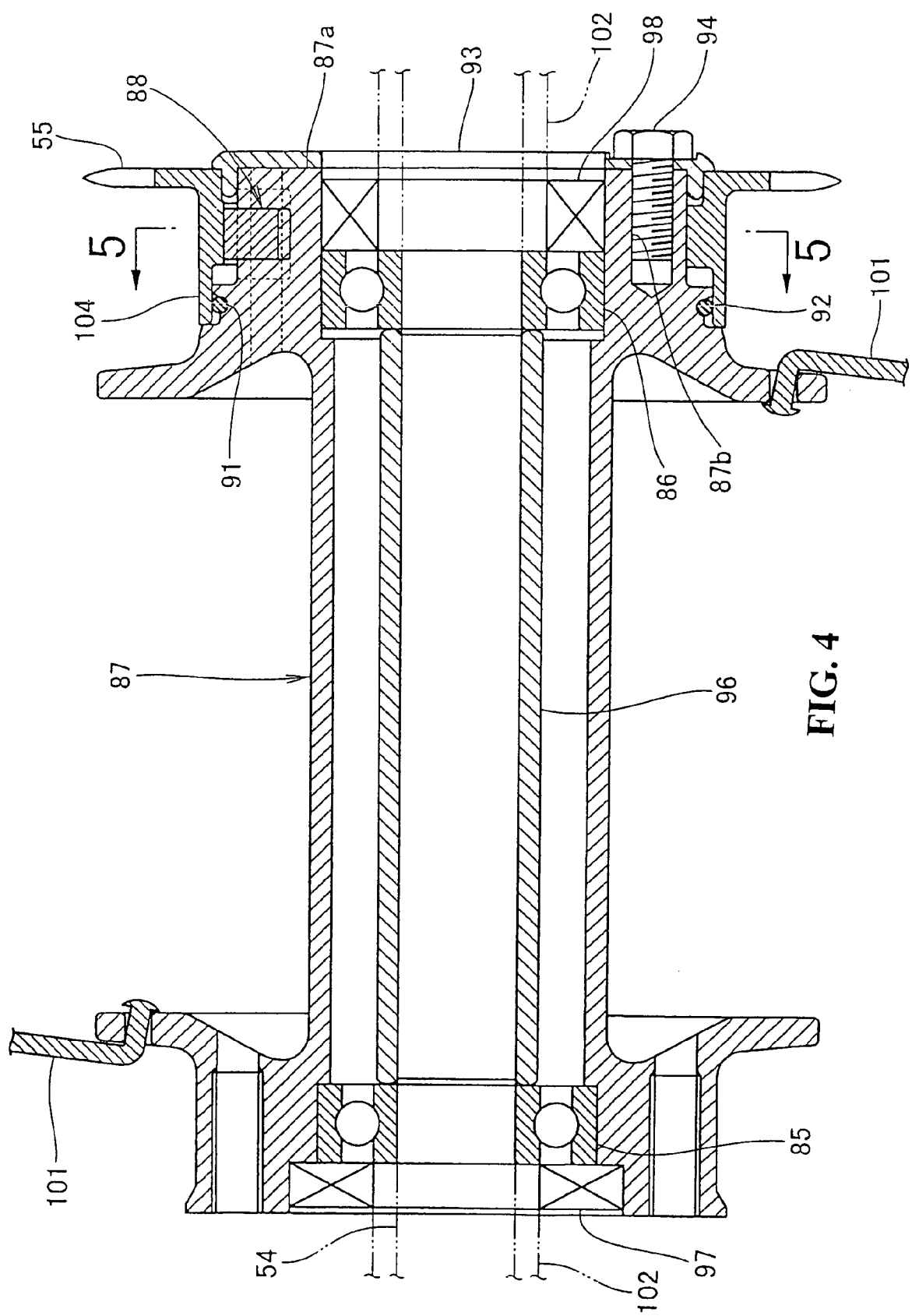
FIG. 4 is a cross-sectional view showing an essential part of a drive force transmission unit to a rear wheel according to the present invention.

FIG. 4 is a cross-sectional view showing an essential part of the drive force transmission unit for transmitting the drive force to the rear wheel according to the present invention. A hub 87 is mounted on the axle 54 for the rear wheel 18 (see FIG. 1) by way of bearings 85, 86, and the driven sprocket wheel 55 is coupled to the hub 87 by way of a one-way clutch (also referred to as a one-way clutch or a freewheel clutch) 88 and an O ring 91.

The one-way clutch 88, when the drive force is transmitted from the transmission 22 (see FIG. 1) side, integrally connects the hub 87 to the driven sprocket wheel 55 so as to rotate the hub 87 and the driven sprocket wheel 55 together. When the driven sprocket wheel 55 is rotated in the direction opposite to this rotating direction, the rotation is not transmitted to the hub 87.

Here, an annular groove 92 is formed in an outer peripheral surface of an end portion of the hub 87 for allowing the O ring 91 to be fitted in the annular groove. A removal prevention cap 93 is mounted on an end surface 87a of the hub 87 using a plurality of bolts 94 so as to prevent the driven sprocket wheel 55 from being removed from the hub 87. A collar 96 maintains a distance between the bearings 85, 86 with sealing members 97, 98 being provided at each end. Spokes 101 connect the hub 87 and a rim (not shown in the drawing). Distance collars 102 are brought into pressure contact with respective end surfaces of the bearings 85, 86 for positioning the bearings 85, 86.

The above-mentioned hub 87, spokes 101, rim (not shown in the drawing) and a tire (not shown in the drawing) which is mounted on the rim constitute the rear wheel 18 (see FIG. 1) which functions as the drive wheel.

Figure 5:
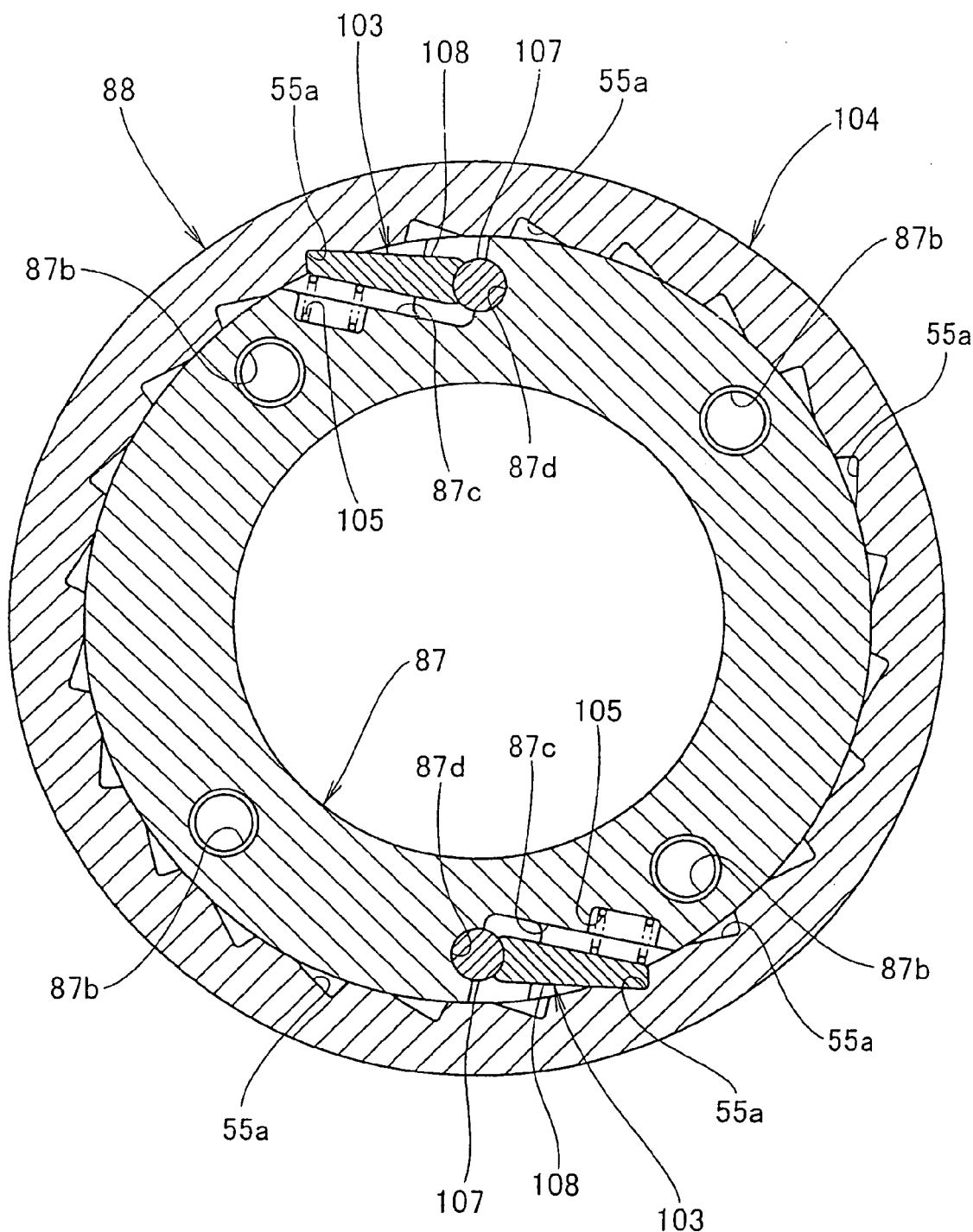
FIG. 5 is a cross-sectional view taken along a line 5-5 in FIG. 4.

FIG. 5 is a cross-sectional view taken along a line 5-5 in FIG. 4, wherein the one-way clutch 88 includes the hub 87 which constitutes an inner clutch. Pawl members 103 are radially swingably mounted on the hub 87 with a cylindrical outer clutch 104 forming a plurality of engaging recessed portions 55a with distal ends of the pawl members 103 being engaged in an inner peripheral surface thereof. Springs 105 bring the pawl members 103 into contact with the engaging recessed portions 55a due to a resilient force. Two pawl members 103 are arranged at an interval of the 180° in the circumferential direction. Female threads 87b are provided into which bolts 94 (see FIG. 4) for mounting the removal prevention cap 93 (see FIG. 4) are engaged.

The pawl members 103 are arranged in the recessed portions 87c formed on the outer peripheral surface of the hub 87, wherein each pawl member 103 includes a pin 107 which is rotatably fitted in a semicircular recessed portion 87d formed in the inside of the recessed portion 87c and a pawl body 108 which is mounted on the pin 107.

The outer clutch 104 is integrally formed on the driven sprocket wheel 55 (see FIG. 4).

The drive force transmission unit of the downhill bicycle 10 (see FIG. 1) includes parts ranging from the pedals 27, 28 (see FIG. 1, numeral 27 not shown in the drawing) to the above-mentioned one-way clutch 88.

Figure 6:
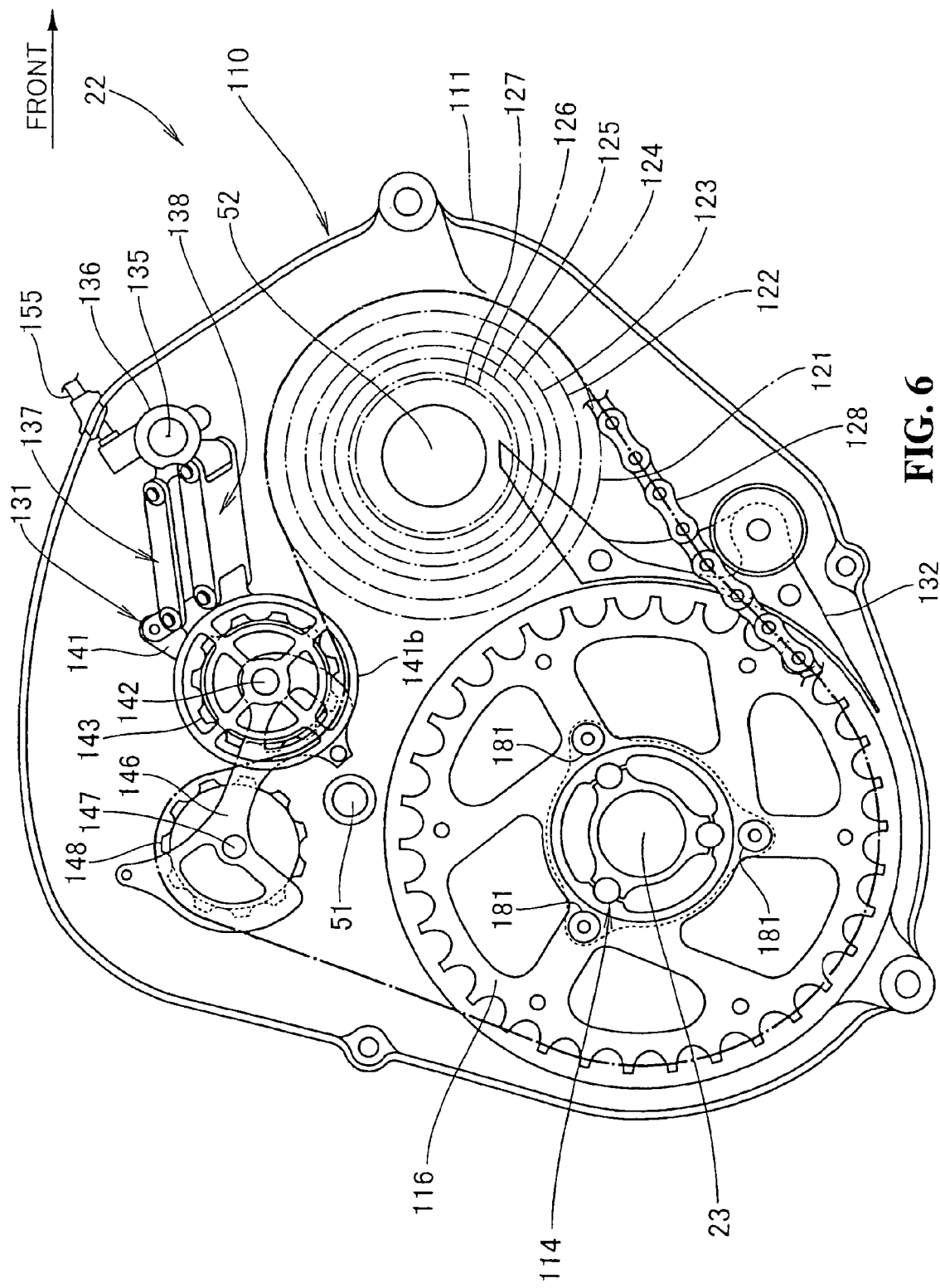
FIG. 6 is a side view for explaining a transmission according to the present invention.

FIG. 6 is a side view for explaining the transmission according to the present invention. The transmission 22 is shown in a state wherein a right case (not shown in the FIG. 6) of a left-and-right two-split case 110 of the transmission 22 is removed. The left case 111 of the case 110 is illustrated in FIG. 6.

The transmission 22 includes the crankshaft 23 which is rotatably mounted on the case 110, a large sprocket wheel 116 which is coupled to the crankshaft 23 by way of a one-way clutch (not shown in the FIG. 6 but explained in detail later) and a slide mechanism 114. An output shaft 52 is arranged frontwardly, obliquely and upwardly with respect to the crankshaft 23 and is rotatably mounted in the case 110 with transmission sprocket wheels 121 to 127 being mounted on the output shaft 52. A transmission chain 128 (indicated also by a bold chain line) is wound around the large sprocket wheel 116 and any one of the transmission sprocket wheels 121 to 127 (in the FIG. 6, the largest transmission sprocket wheel 121 is shown). A derailleur (exteriorly mounted transmission (derail means "to be offset from rails") 131 is provided for moving the transmission chain 128 for changing the winding of the transmission chain 128 with any one of the transmission sprocket wheels 121 to 127 in a sideward direction (i.e., an inside and outside direction of FIG. 6). A chain guide member 132 guides the transmission chain 128 from the transmission sprocket wheels 121 to 127 side to the large sprocket wheel 116 side.

The derailleur 131 includes a support shaft 135 which is mounted on the case 110, a base portion 136 which is mounted on the support shaft 135, a first link 137 and a second link 138 which are swingably mounted on the base portion 136. A bracket 141 is mounted on respective distal ends of the first link 137 and the second link 138 with a support shaft 142 which is mounted on the bracket 141. A guide pulley 143 includes a sprocket wheel which is rotatably mounted on the support shaft 142, pulley support plates 144, 146 (only numeral 146 on a front side shown in the FIG. 6) which are swingably mounted on the support shaft 142, a support shaft 147 which is mounted on these pulley support plates 144, 146, a tension pulley 148 which constitutes a sprocket wheel which is rotatably mounted on the support shaft 147, and a torsion spring (not shown in the drawing, the detail being explained later) which generates a chain tension on the tension pulley 148 by biasing the pulley support plates 144, 146 about the support shaft 142 in the clockwise direction with respect to the bracket 141. A transmission cable 155 has a distal end thereof mounted on the first link 137. The transmission cable 155 is provided for moving the guide pulley 143 and the tension pulley 148 in the front-and-back direction of this paper surface by swinging the first link 137 and the second link 138 to change the winding of the transmission chain 128 with any one of the sprocket wheels 121 to 127.

Figure 7:
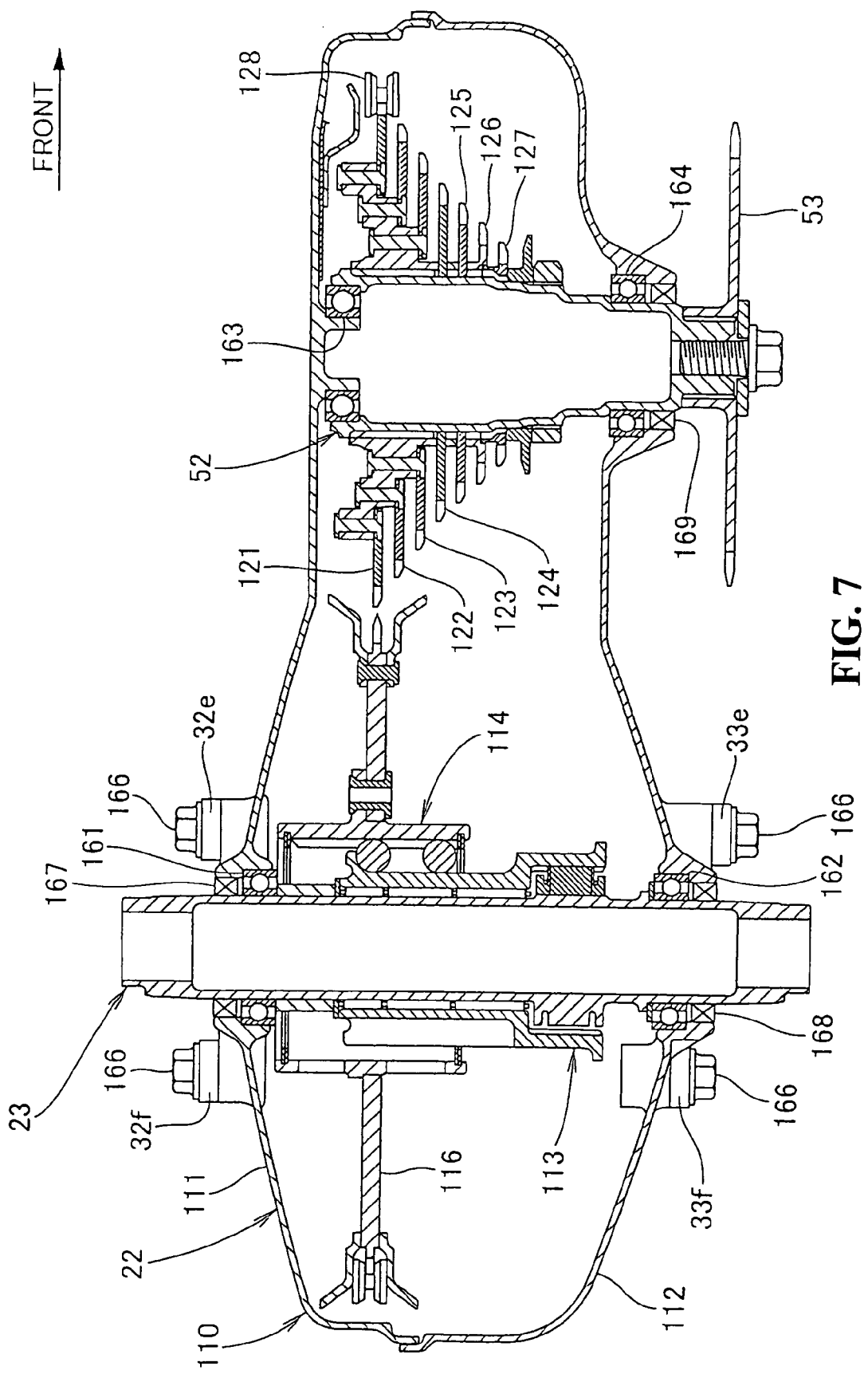
FIG. 7 is a first cross-sectional view of the transmission according to the present invention.

FIG. 7 is a first cross-sectional view of the transmission according to the present invention that shows a cross section which passes through the crankshaft 23 and the output shaft 52.

In the transmission 22, the case 110 includes the left case 111 and the right case 112, the crankshaft 23 is mounted on the left case 111 and the right case 112 by way of bearings 161, 162. A hollow output shaft 52 is mounted on the left case 111 and the right case 112 by way of bearings 163, 164. The left case 111 and right case 112 are mounted on mounting portions 32e, 32f, 33e, 33f which are formed on the rear frames 32, 33 (see FIG. 1) using a plurality of mounting bolts 166. Sealing members 167, 168, 169 are provide therebetween.

The large sprocket wheel 116 is a member which is coupled to the crankshaft 23 by way of the one-way clutch 113 which is arranged on a right side of the longitudinal center of the crankshaft 23 and the slide mechanism 114 which includes a plurality of balls 170. That is, the drive force is transmitted through a path of the crankshaft 23→the one-way clutch 113→the slide mechanism 114→the large sprocket wheel 116.

The output shaft 52 mounts the transmission sprocket wheels 121 to 127 thereon in the inside of the casing 110, while the drive sprocket wheel 53 is mounted outside the case 110.

The transmission sprocket wheels 121 to 127 are sequentially arranged from the left side (the upper side in the drawing) to the right side (the lower side in the drawing) in order from the first-stage transmission sprocket wheel 121 having the largest number of teeth (that is, having the largest outer diameter) to the seventh-stage transmission sprocket wheel 127 having the smallest number of teeth (that is, having the smallest outer diameter).

When the winding of the transmission chain 128 is changed to any one of the transmission sprocket wheels 121 to 127 (here, the transmission sprocket wheel 121), due to a sideward force of the transmission 22 which acts on the large sprocket wheel 116 due to such winding by way of the transmission chain 128, the large sprocket wheel 116 is moved along the crankshaft 23 to a position where the large sprocket wheel 116 corresponds to any one of the transmission sprocket wheels 121 to 127 around which the transmission chain 128 is wound using the slide mechanism 114.

Figure 8:
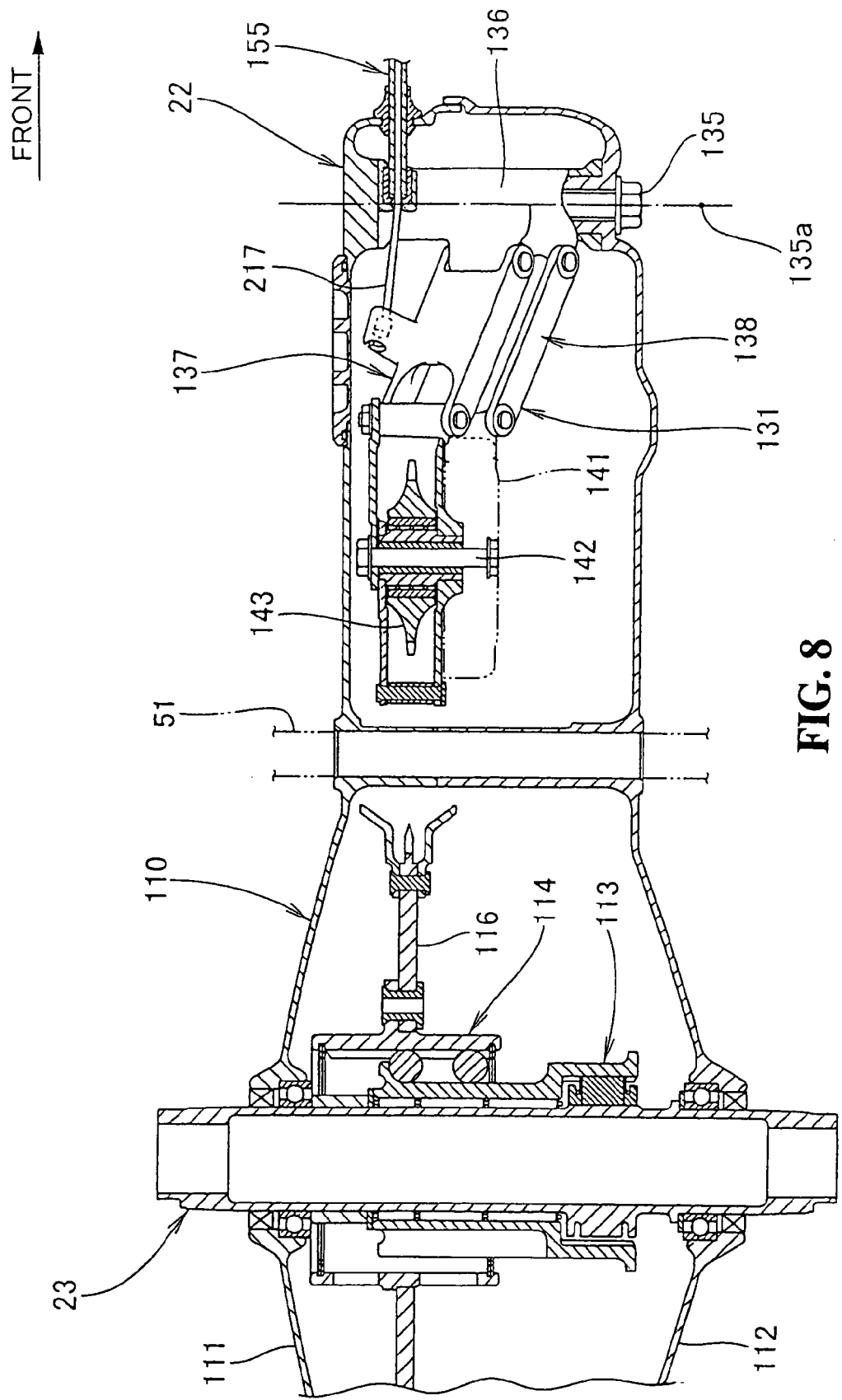
FIG. 8 is a second cross-sectional view of the transmission according to the present invention.

FIG. 8 is a second cross-sectional view of the transmission according to the present invention that shows a cross section which passes the crankshaft 23, the pivot shaft 51 and the support shafts 135, 142 of the derailleur 131.

The derailleur 131 is provided for moving the guide pulley 143 in parallel to the left-and-right direction of the transmission 22 by mounting the first link 137 and the second link 138 in parallel between the base portion 136 and the bracket 141 and for moving the guide pulley 143 in the front-and-back direction of the drawing by obliquely mounting respective swing shafts of the first link 137 and the second link 138 with respect to the axis 135a of the support shaft 135.

When the guide pulley 143 moves in the left-and-right direction of the transmission 22, the large sprocket wheel 116 moves in the left-and-right direction of the transmission 22 by way of the transmission chain 128 which is wound around the guide pulley 143.

Figure 9:
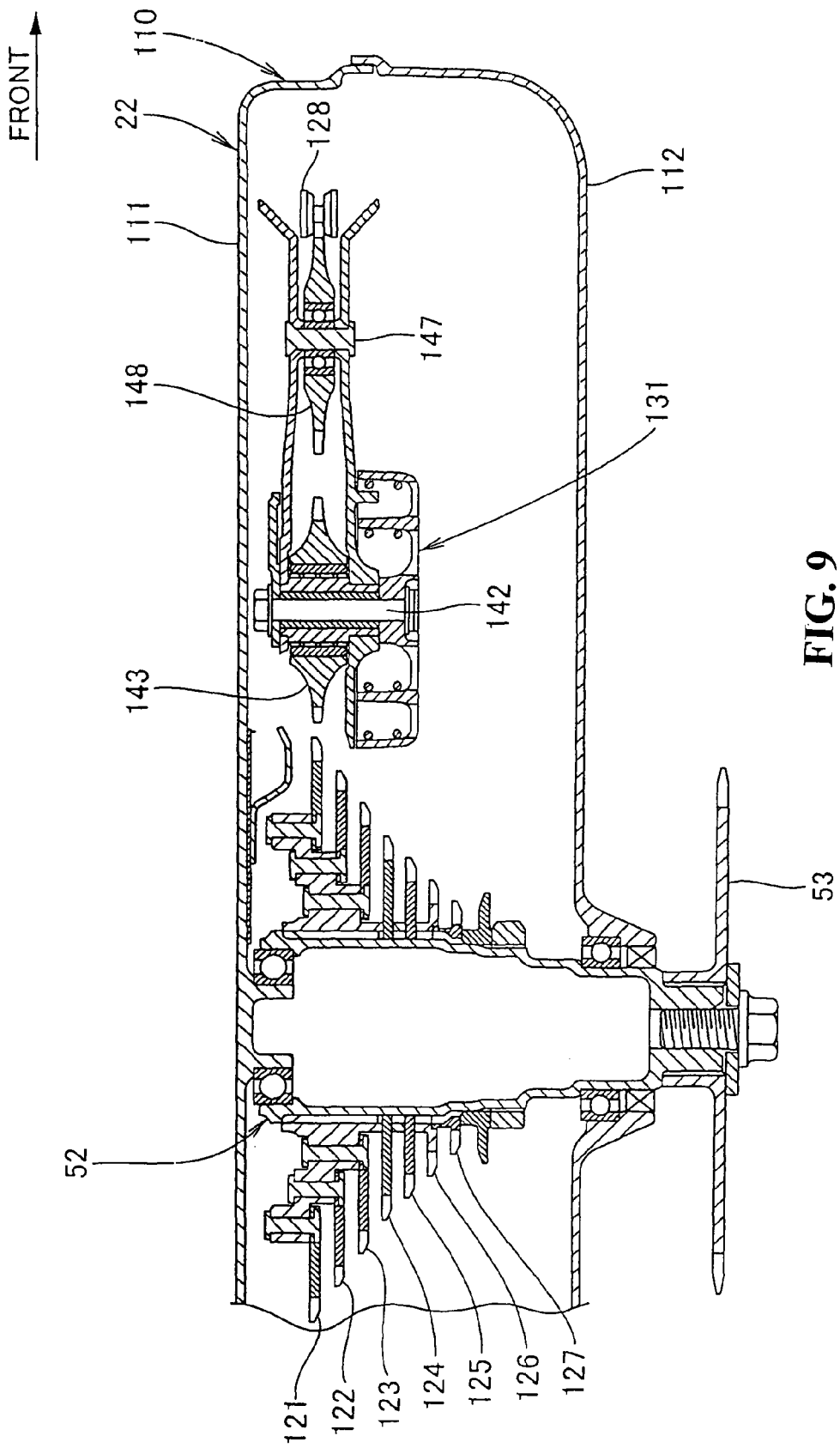
FIG. 9 is a third cross-sectional view of the transmission according to the present invention.

FIG. 9 is a third cross-sectional view of the transmission according to the present invention that shows a cross section which passes the output shaft 52 and the support shafts 142, 147 of the derailleur 131.

The derailleur 131 moves in the left-and-right direction of the transmission 22 as well as in the front-and-rear direction of the transmission 22 such that a distance between any one of the transmission sprocket wheels 121 to 127 which is newly wound by the transmission chain 128 and the guide pulley 143 is substantially set equal when the guide pulley 143 and the tension pulley 148 are moved in the left-and-right direction of the transmission 22 by the first link 137 (see FIG. 8) and the second link 138 (see FIG. 8). For example, when the transmission chain 128 is newly wound around the first-stage transmission sprocket wheel 121, the guide pulley 143 is moved frontwardly, obliquely and leftwardly to approach a position in front of the transmission sprocket wheel 121, while when the transmission chain 128 is newly wound around the seventh-stage transmission sprocket wheel 127, the guide pulley 143 is moved rearwardly, obliquely and rightwardly to approach a position in front of the transmission sprocket wheel 127.

Figure 10:
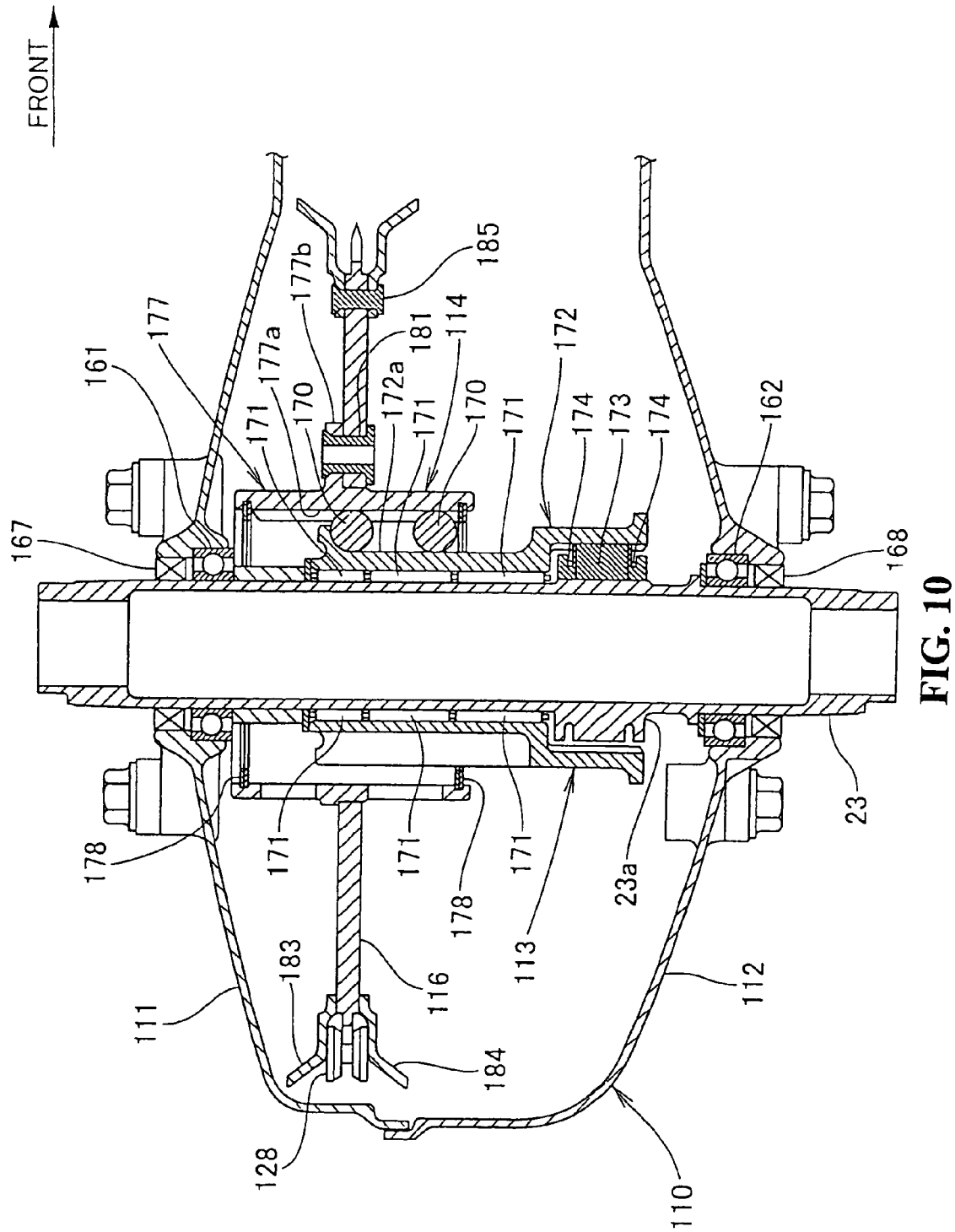
FIG. 10 is a cross-sectional view of an essential part showing a crankshaft and the structure around the crankshaft according to the present invention.

FIG. 10 is a cross-sectional view of an essential part of the structure of the crankshaft and a periphery thereof according to the present invention. As shown in the drawing, the one-way clutch 113 includes an inner clutch 23a which is integrally formed on the crankshaft 23, a cylindrical member 172 which includes an outer clutch which is rotatably mounted on the crankshaft 23 by way of a plurality of needles 171, a plurality of pawl members 173 which are respectively interposed between the inner clutch 23a and the cylindrical member 172, and a plurality of ring-like springs 174 which bring these pawl members 173 into pressure contact with the cylindrical member 172 by a resilient force.

The slide mechanism 114 includes the cylindrical member 172, a plurality of balls 170 which are respectively arranged on the inside of outer peripheral grooves 172a formed in the cylindrical member 172, a large-diameter cylindrical member 177 which forms a plurality of grooves 177a in which the balls 170 are arranged therein, and ring members 178, 178 which are fitted into both end portions of an inner peripheral surface of the large-diameter cylindrical member 177 to prevent the balls 170 from being removed from the grooves 177a. Further, the large sprocket wheel 116 is mounted on a flange 177b which is integrally formed on an outer peripheral surface of the large-diameter cylindrical member 177 using a plurality of rivets 181. Due to such a construction, the large sprocket wheel 116 is slidable in the axial direction of the crankshaft 23. Chain removal prevention members 183, 184 are mounted on a side surface in the vicinity of an outer periphery of the large sprocket wheel 116 using a plurality of rivets 185 to prevent the transmission chain 128 from being removed from the large sprocket wheel 116.

Figure 11:
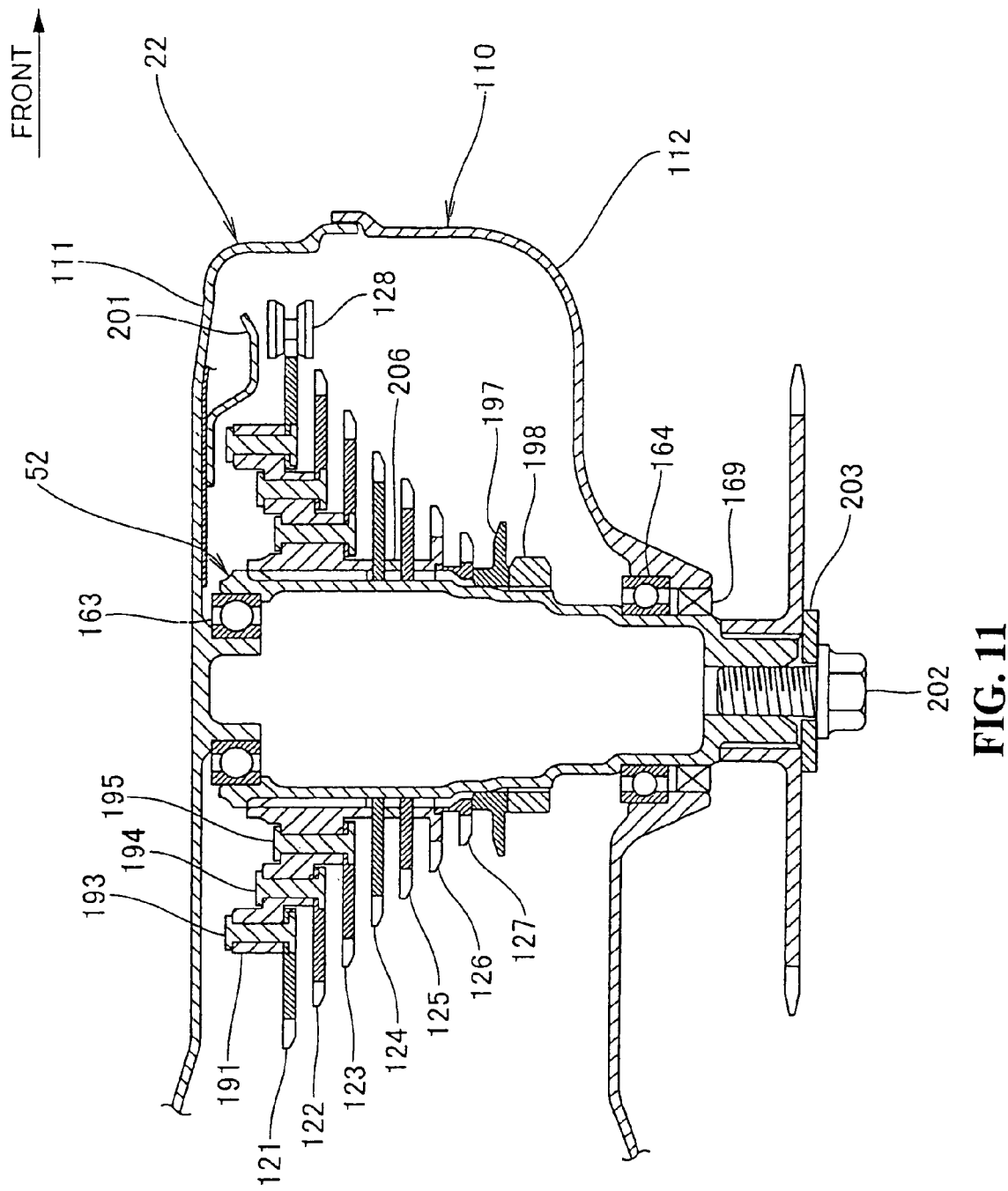
FIG. 11 is a cross-sectional view of an essential part showing an output shaft and the structure around the output shaft according to the present invention.

FIG. 11 is a cross-sectional view of an essential part showing the structure of the output shaft and a periphery of the output shaft according to the present invention. Transmission sprocket wheels 121 to 127 are mounted on the output shaft 52 as follows. The transmission sprocket wheels 121 to 123 are respectively mounted on a sprocket wheel support member 191 using rivets 193 to 195. The sprocket wheel support member 191 is coupled to the output shaft 52 by a spline fitting. In the same manner, the transmission sprocket wheels 124 to 127 are respectively coupled to the output shaft 52 by a spline fitting. A chain removal prevention flange member 197 is fitted on the output shaft 52 on a right side of the transmission sprocket wheel 127 which is arranged on a rightmost side of the transmission 22 to prevent the transmission chain 128 which is wound around the transmission sprocket wheel 127 from being removed from the transmission sprocket 127. A nut member 198 is threadedly engaged with the output shaft 52 on a right side of the chain removal prevention flange member 197.

A chain removal preventing plate 201 is mounted on an inner wall of the left case 111 for preventing the removal of a transmission chain 128 which is wound around the transmission sprocket wheel 121. A bolt 202 is used for mounting the drive sprocket wheel 53 on the output shaft 52 with a washer 203, and a collar 206 being used for maintaining a distance between the transmission sprocket wheels 124, 125.

Figure 12:
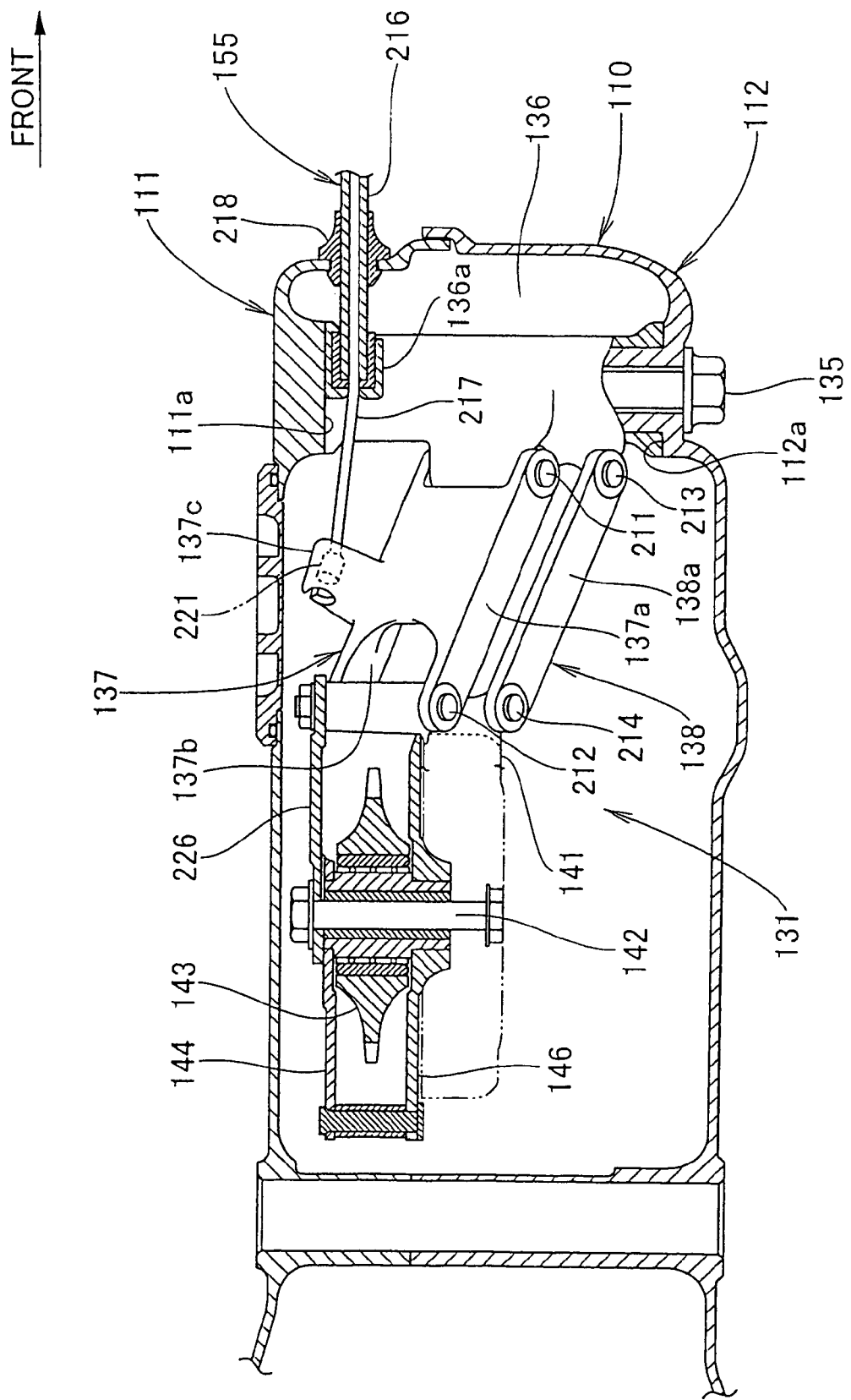
FIG. 12 is a first cross-sectional view showing the structure of a derailleur according to the present invention.

FIG. 12 is a first cross-sectional view showing the structure of the derailleur according to the present invention, wherein a base portion 136 of the derailleur 131 is mounted on the case 110 as follows. Both end portions of the base portion 136 are respectively brought into contact with a left mounting seat 111a of the left case 111 and a right mounting seat 112a of the right case 112. A bolt-like support shaft 135 is allowed to penetrate the right mounting seat 112a, the base portion 136 and the left mounting seat 111a with an end portion of the shaft 135 being meshed into a nut (not shown in FIG. 12).

The first link 137 is formed by integrally connecting two link plates 137a, 137b, swingably mounted on the base portion 136 using a pin 211, and swingably mounted on the bracket 141 using a pin 212.

The second link 138 is formed by integrally connecting two link plates 138a, 138b (only numeral 138a on a front side shown in FIG. 12), swingably mounted on the base portion 136 using a pin 213, and swingably mounted on the bracket 141 using a pin 214.

The pins 211, 213 in a mounted state constitute members which are inclined by approximately 40° with respect to the support shaft 135 such that the right-side end portions (lower-side portions in FIG. 12) of the pins 211, 213 are arranged in the front side compared to the left-side end portions (upper-side portions in FIG. 12) of the pins 211, 213.

The first link 137 is a member which has a cable support portion 137c which supports an end portion of the transmission cable 155 integrally formed thereon.

The transmission cable 155 includes an outer tube 216 and an inner wire 217 which is movably inserted into the inside of the outer tube 216. The transmission cable 155 is allowed to penetrate a grommet 218 which is fitted in the left case 111. An end portion of the outer tube 216 is inserted into the cable support portion 136a which is integrally formed with the base portion 136. An engaging lug 221, which is formed on a distal end of the inner wire 217, is engaged with a cable support member 137c of the first link 137.

In FIG. 12, the inner wire 217 of the transmission cable 155 is pulled in the rightward direction so that the guide pulley 143 is moved to a position which corresponds to the transmission sprocket wheel 121 (see FIG. 11). By slackening the inner wire 217 from this state, due to a resilient force of a spring not shown in FIG. 12 (the detail being explained later), the first link 137 and the second link 138 are swung downwardly.

Figure 13:
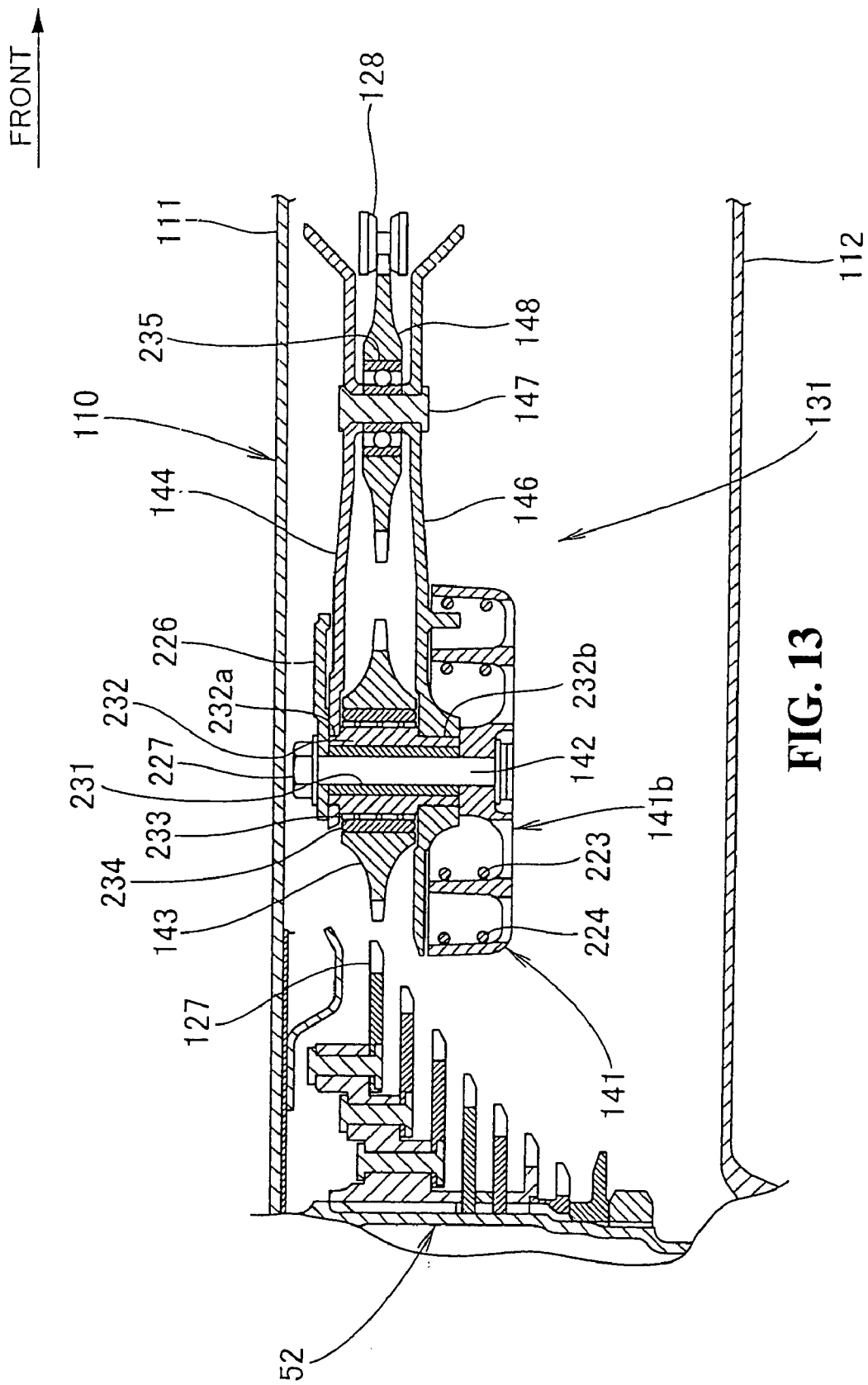
FIG. 13 is a second cross-sectional view showing the structure of a derailleur according to the present invention.

FIG. 13 is a second cross-sectional view showing the structure of the derailleur according to the present invention, wherein the drawing shows a state in which an approximately cup-shaped spring accommodating portion 141b is integrally formed on a bracket 141 of the derailleur 131 and two torsion springs (torsional coil springs) 223, 224 are accommodated in the spring accommodating portion 141b in a concentrically overlapped manner. The torsion springs 223, 224 impart a rotational force about the support shaft 142 to pulley support plates 144, 146 due to resilient forces thereof whereby the tension pulley 148 generates a tension in the transmission chain 128 to push an endless transmission chain 128 from the inside thereof.

The support shaft 142 extends between a spring accommodating portion 141b of the bracket 141 and a support plate 226 which constitutes the bracket 141. A nut 227 is threadedly engaged with an end portion of the bolt-like support shaft 142.

The guide pulley 143 constitutes a member which is mounted on the support shaft 142 by way of a bushing 231, a cylindrical member 232, a plurality of needles 233 and a collar 234.

The pulley support plates 144, 146 are members which are swingably fitted on stepped portions 232a, 232b which are formed on end portions of the cylindrical member 232.

The tension pulley 148 is a member which is mounted on a support shaft 147 which extends between the pulley support plates 144, 146 by way of a bearing 235.

Figure 14:
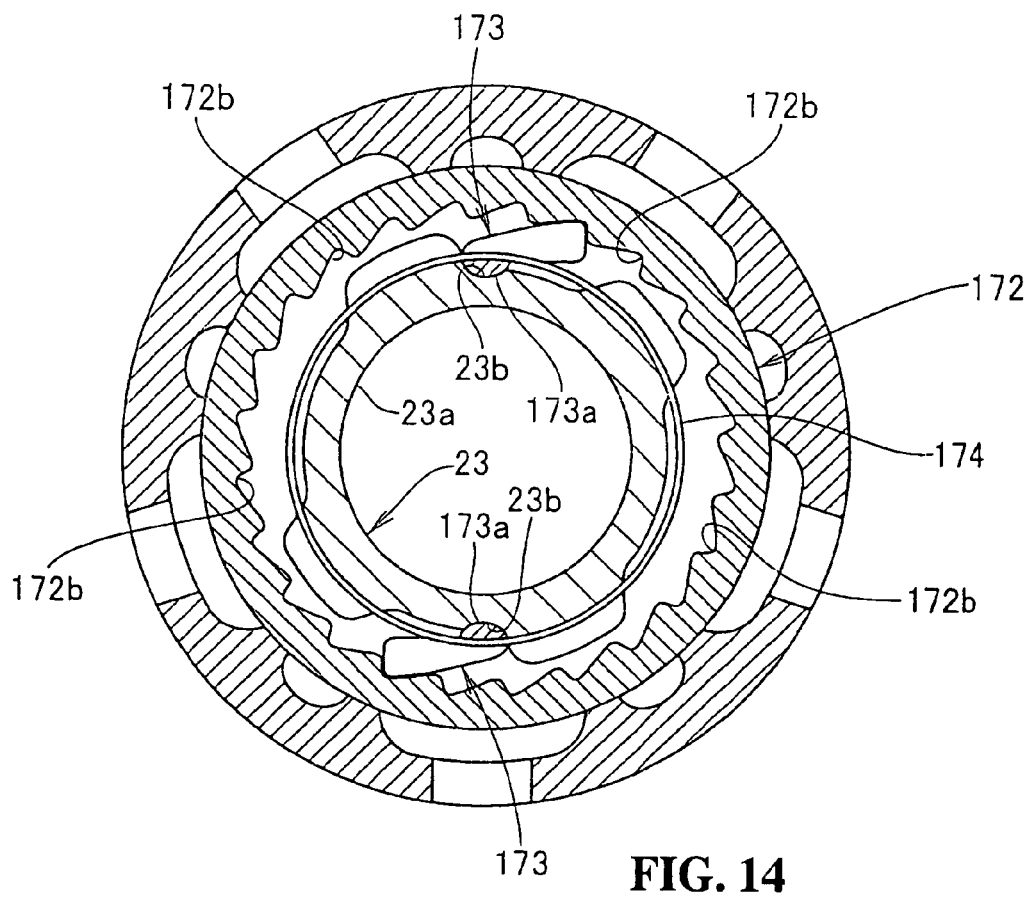
FIG. 14 is a cross-sectional view of a one-way clutch mounted on the crankshaft according to the present invention.

FIG. 14 is a cross-sectional view of a one-way clutch which is mounted on the crankshaft according to the present invention. FIG. 14 shows a state in which a plurality of arcuate grooves 23b having an arcuate cross section are formed on an outer peripheral surface of the inner clutch 23a of the crankshaft 23. The pawl members 173 are provided with a proximal portion 173a having an approximately semicircular section that are swingably inserted into these circular grooves 23b. A ring-like spring 174 is fitted on the inner clutch 23a in a state wherein the spring 174 fastens the proximal portions 173a. The distal ends of the pawl members 173 are resiliently brought into pressure contact with a plurality of inner surface grooves 172b formed on an inner peripheral surface of the cylindrical member 172 which constitutes an outer clutch.

Figure 15:
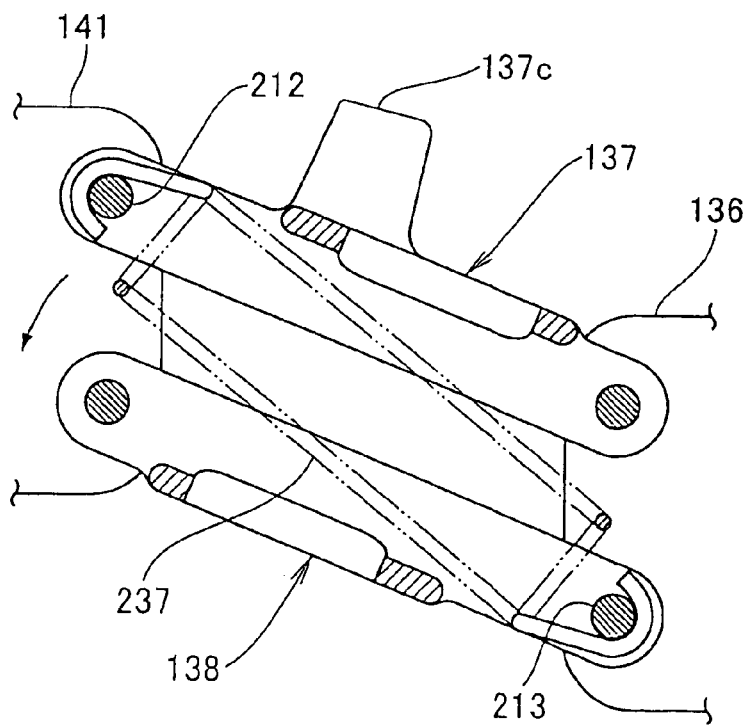
FIG. 15 is a cross-sectional view showing a first link and a second link of the derailleur according to the present invention.

FIG. 15 is a cross-sectional view showing a first link and a second link of the derailleur according to the present invention wherein a spring (constituting a tensile coil spring) 237 extends between a pin 213 which serves to mount the second link 138 on the base portion 136 and a pin 212 which mounts the first link 137 on the bracket 141. Due to such a construction, by making use of a tensile force of the spring 237, it is possible to generate a force which moves the bracket 141 in the direction of an arrow with respect to the base portion 136 by way of the first link 137 and the second link 138.

Next, the manner of operation of the above-mentioned chain tension adjusting unit 63 is explained.

Figures 16A, 16B:
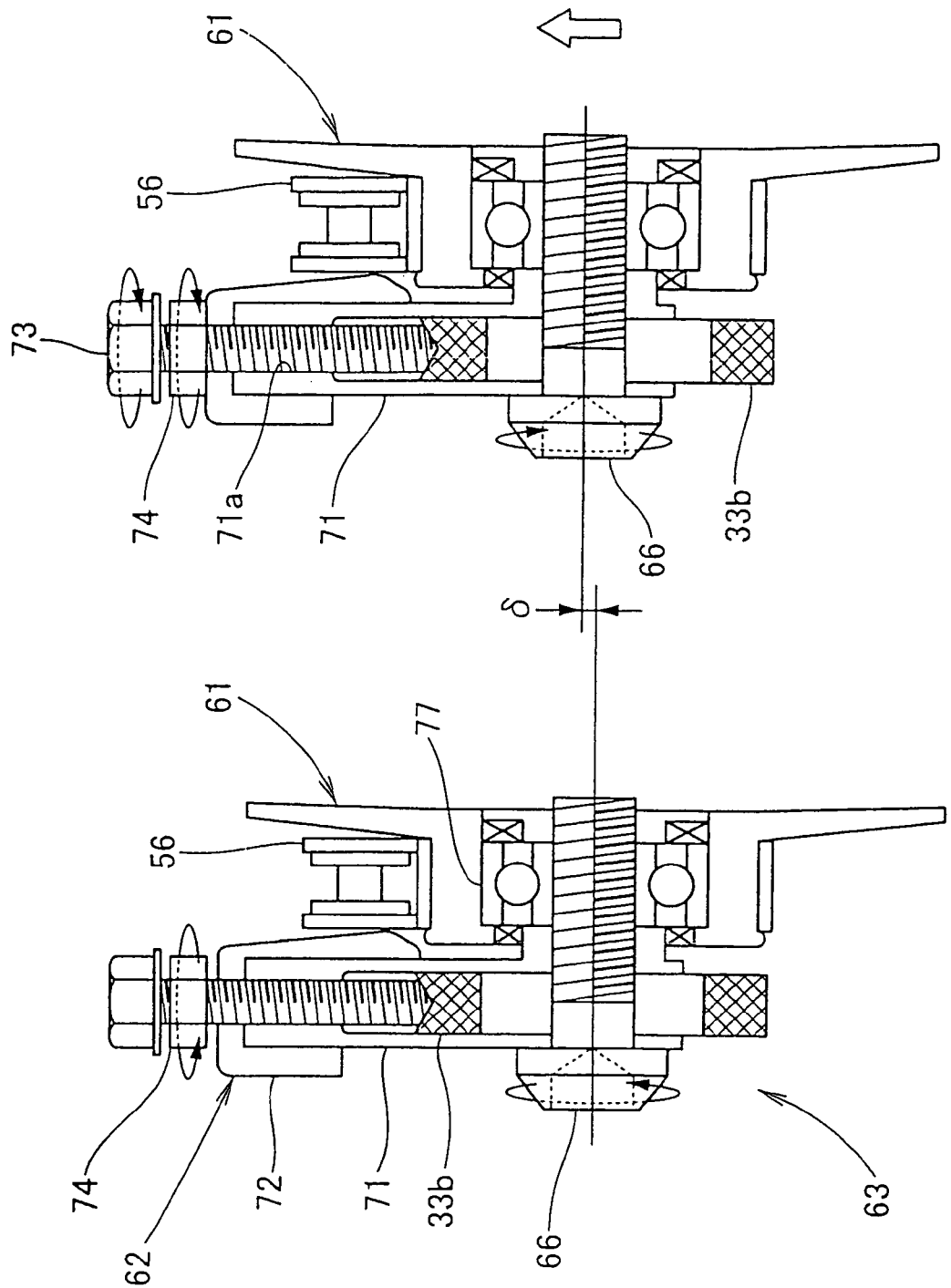
FIGS. 16(a) and 16(b) are cross-sectional views showing the manner of the operation of the chain tension adjusting unit according to the present invention.

FIG. 16(a) and FIG. 16(b) are cross-sectional views showing the manner of operation of the chain tension adjusting unit according to the present invention. Here, to facilitate the understanding of the shape, a cross hatching is applied to a plate-like projection 33b of the rear frame 33.

In FIG. 16(a), first of all, a hexagonal socket head cap screw 66 is slackened by the rotating hexagonal socket head cap screw 66 in an arrow direction using a hexagonal wrench. Next, a locking nut 74 is slackened by rotating the locking nut 74 in an arrow direction.

In FIG. 16(b), an adjust bolt 73 is rotated in an arrow direction, accordingly, a mounting member 71, which is provided with female threads 71a into which the adjust bolt 73 is threaded, is moved upwardly with respect to the plate-like projection 33b, and the tension roller 61 is integrally moved with the mounting member 71 in an outlined arrow direction (that is, upwardly). As a result, the tension of the chain 56 is increased. Here, symbol δ in the drawing shows a movement quantity of the tension roller 61, that is, a movement amount of the hexagonal socket head cap screw 66.

Thereafter, the locking nut 74 is fastened by rotating in the arrow direction for fastening. Further, the hexagonal socket head cap screw 66 is fastened by rotating the hexagonal socket head cap screw 66 in the arrow direction using a hexagonal wrench. Accordingly, the chain tension adjustment is completed.

Next, the manner of operation of the O ring 91 is explained in conjunction with FIG. 4 and FIG. 5.

In FIG. 4, in a state that the O ring 91 is interposed between the hub 87 and the outer clutch 104, the O ring 91 is compressed. Thus, when a torque which is provided for generating the relative rotation between the hub 87 and the outer clutch 104 is applied, a large frictional force is generated between the hub 87 and the O ring 91 as well as between the O ring 91 and the outer clutch 104.

Accordingly, when the O ring 91 is not present, although the relative rotation of one-way clutch 88 in one direction is allowed, in this case, the above-mentioned relative rotation is obstructed by the frictional force attributed to the O ring 91. That is, the hub 87 and the outer clutch 104 are integrally rotated in any rotational direction.

However, when an excessively large torque is applied, which exceeds a given torque acts between the hub 87 and the outer clutch 104, slipping is generated against the above-mentioned frictional force between the hub 87 and the O ring 91, between the O ring 91 and the outer clutch 104 or between the hub 87 and the O ring 91 as well as between the O ring 91 and the outer clutch 104 whereby the relative rotation is generated between the hub 87 and the outer clutch 104. Accordingly, it is possible to prevent an excessive load from being applied to respective parts of the drive force transmission unit, for example, the hub 87, the driven sprocket wheel 55, the chain 56 shown in FIG. 2, the drive sprocket wheel 53, the transmission 22 and the like.

Next, the manner of operation of the transmission 22 is explained hereinafter in conjunction with FIG. 17 to FIG. 20.

Figure 17:
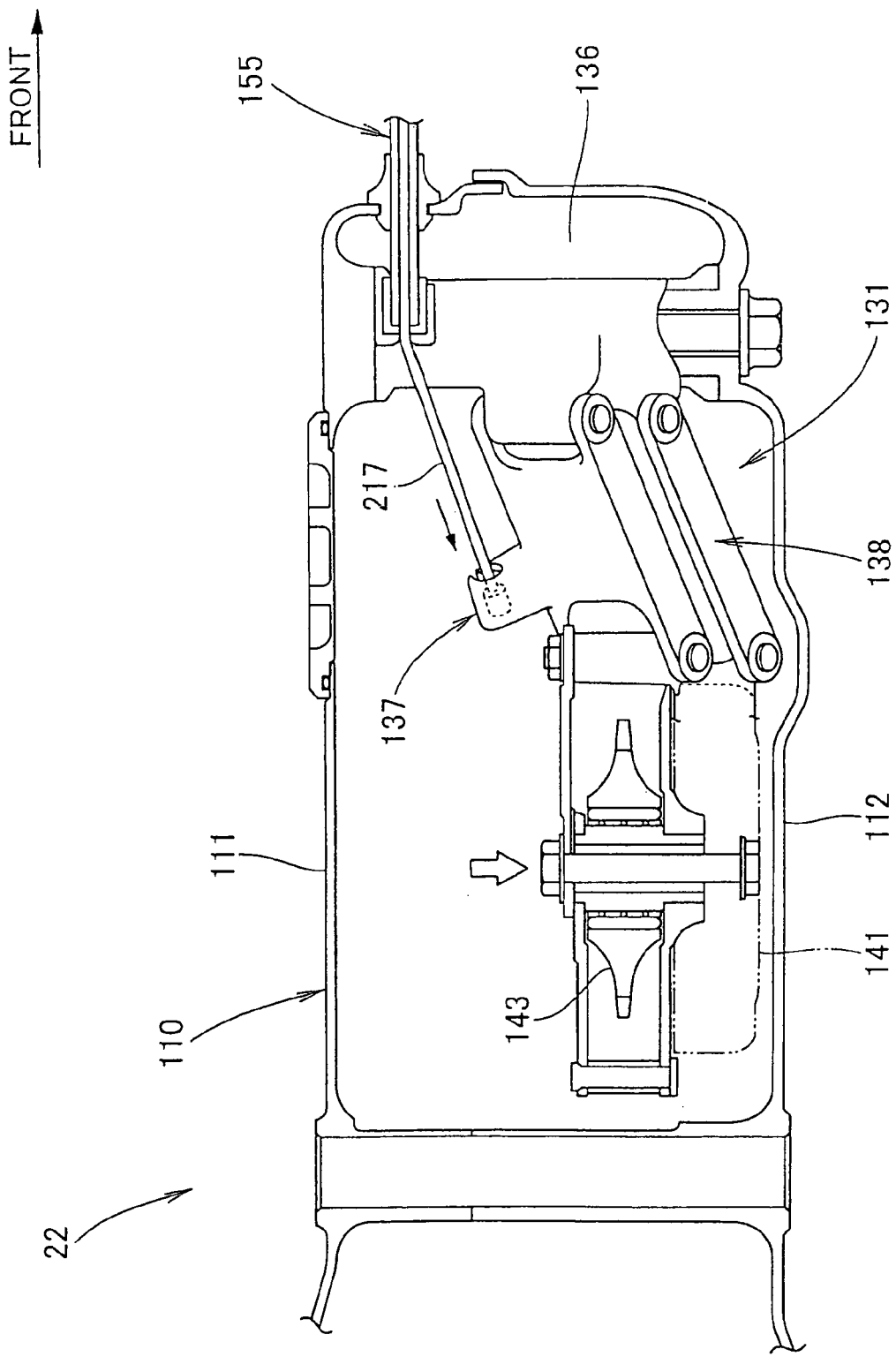
FIG. 17 is a first operational view showing the manner of operation of the transmission according to the present invention.

FIG. 17 is a first operational view showing the operation of the transmission according to the present invention.

In FIG. 17, when the inner wire 217 of the transmission cable 155 is slackened and is moved in the arrow direction from the state shown in FIG. 12, due to the resilient force of the spring 237 which is arranged in the inside of the first link 137 and the second link 138 (see FIG. 15), the first link 137 and the second link 138 are swung rightwardly (downwardly in the drawing) in the inside of the case 110. Thus, the guide pulley 143 is moved in parallel in the inside of the case 110 as indicated by an outlined arrow.

Figure 18:
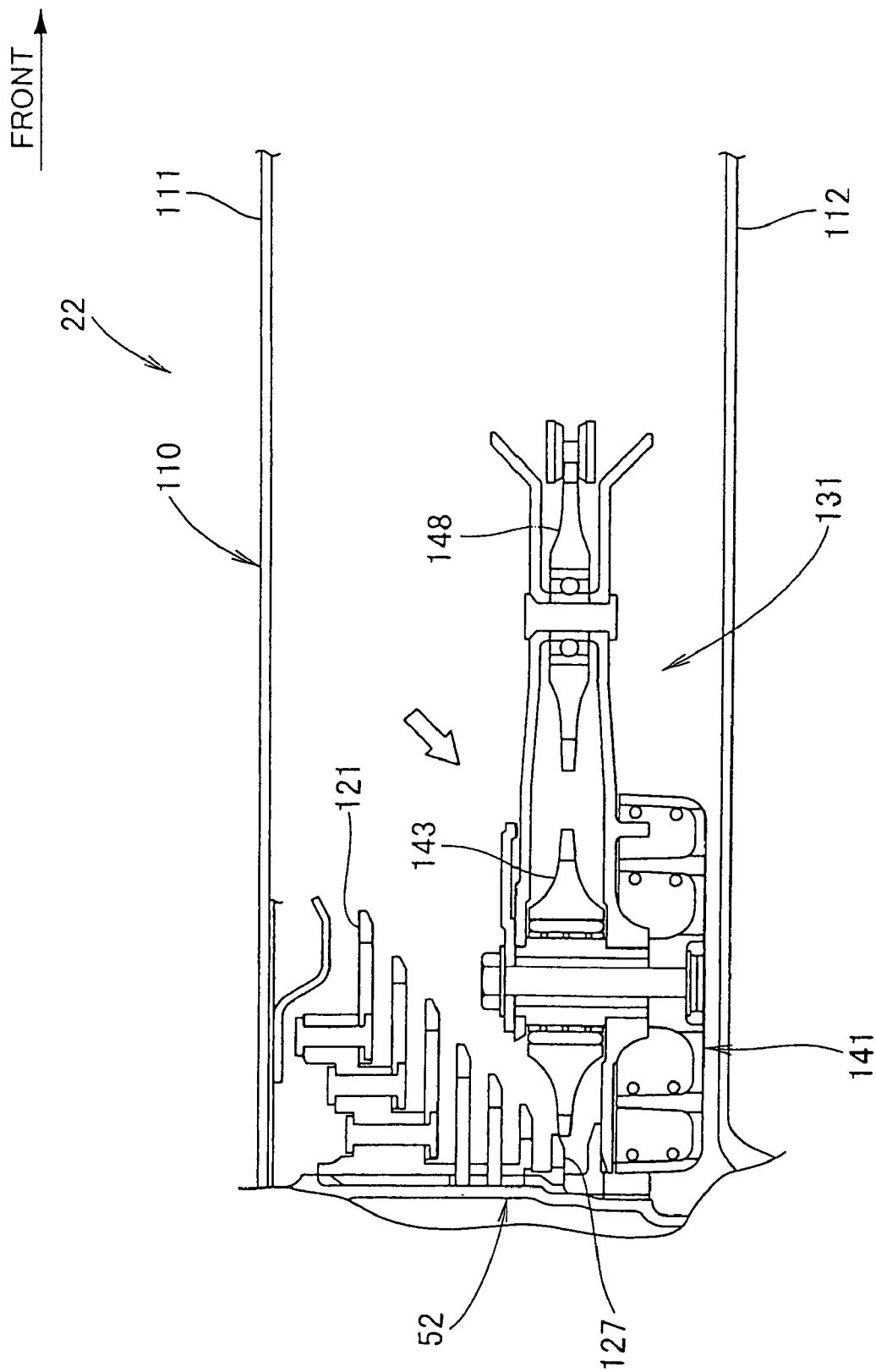
FIG. 18 is a second operational view showing the manner of operation of the transmission according to the present invention.

FIG. 18 is a second operational view showing the manner of operation of the transmission according to the present invention.

In FIG. 18, along with the swinging of the first link 137 (see FIG. 17) and the second link 138 (see FIG. 17) rightwardly (downwardly in the drawing) in the inside of the case 110 from the state shown in FIG. 13, the bracket 141, the guide pulley 143 and the tension pulley 148 are moved in parallel as indicated by an outlined arrow such that the first link 137 and the second link 138 are arranged on the right side and approach the output shaft 52 in the inside of the case 110.

Figure 19:
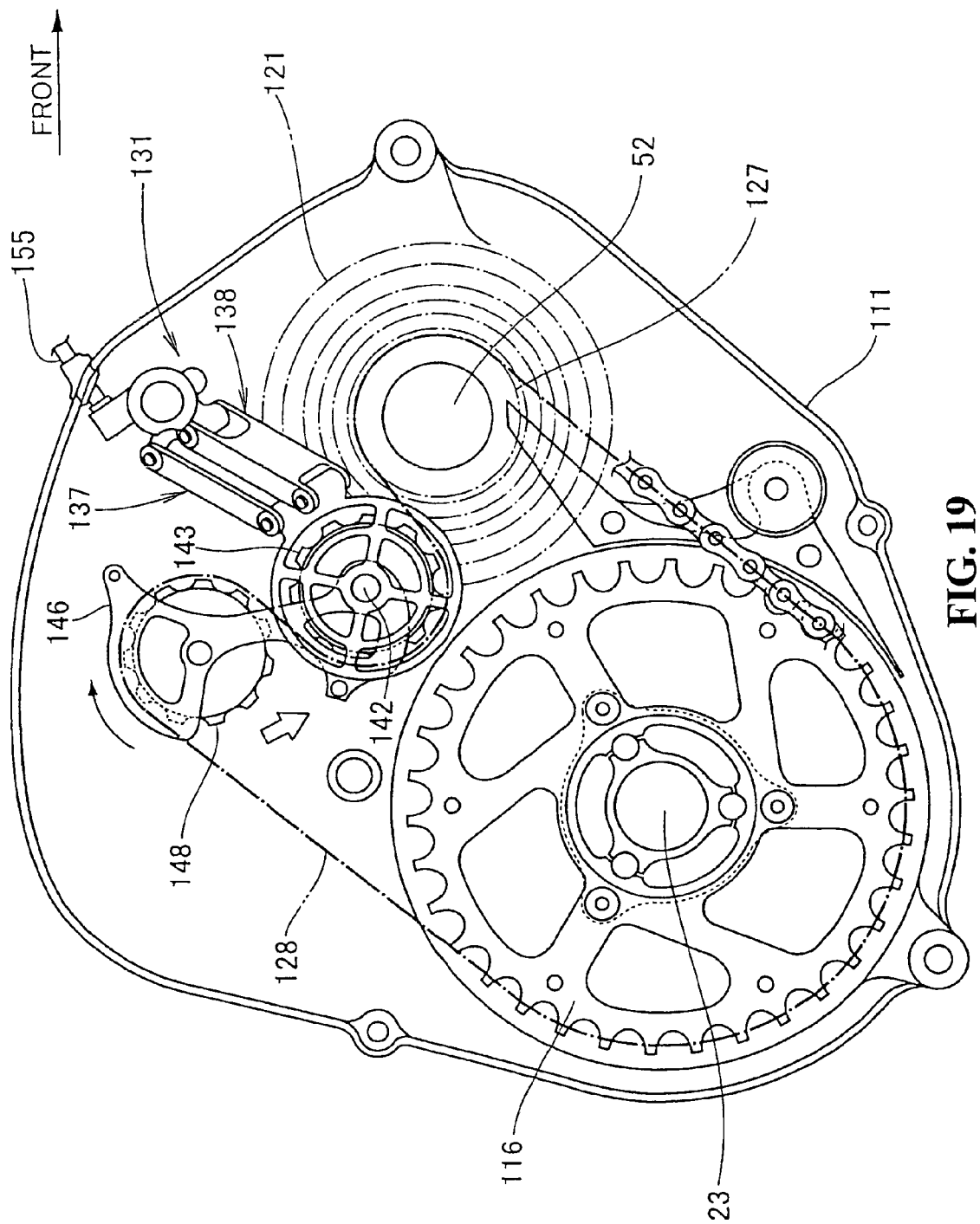
FIG. 19 is a third operational view showing the manner of operation of the transmission according to the present invention.

FIG. 19 is a third operational view showing the manner of the operation of the transmission according to the present invention.

As shown in FIG. 19, the guide pulley 143 of the derailleur 131 is moved from the state shown in FIG. 6 to a front side as well as an output shaft 52 side along with the swinging of the first link 137 and the second link 138, whereby the transmission is shifted from the transmission sprocket wheel 121 side to the transmission sprocket wheel 127 side.

Further, here, in a state wherein the transmission operation is shifted to the transmission sprocket wheel 127 having a small number of teeth, with respect to a length of the transmission chain 128, a remaining length of the transmission chain 128 which is wound around the large sprocket wheel 116 and the transmission sprocket wheel 127 becomes greater than a remaining length of the transmission chain 128 which is wound around the large sprocket wheel 116 and the transmission sprocket wheel 121 shown in FIG. 6. Thus, the tension pulley 148 is rotated about the support shaft 142 of the guide pulley 143 due to a rotational force of the torsion springs 223, 224 (see FIG. 13) in the direction indicated by an arrow, that is, in the clockwise direction thus maintaining the tension of the transmission chain 128.

Figure 20:
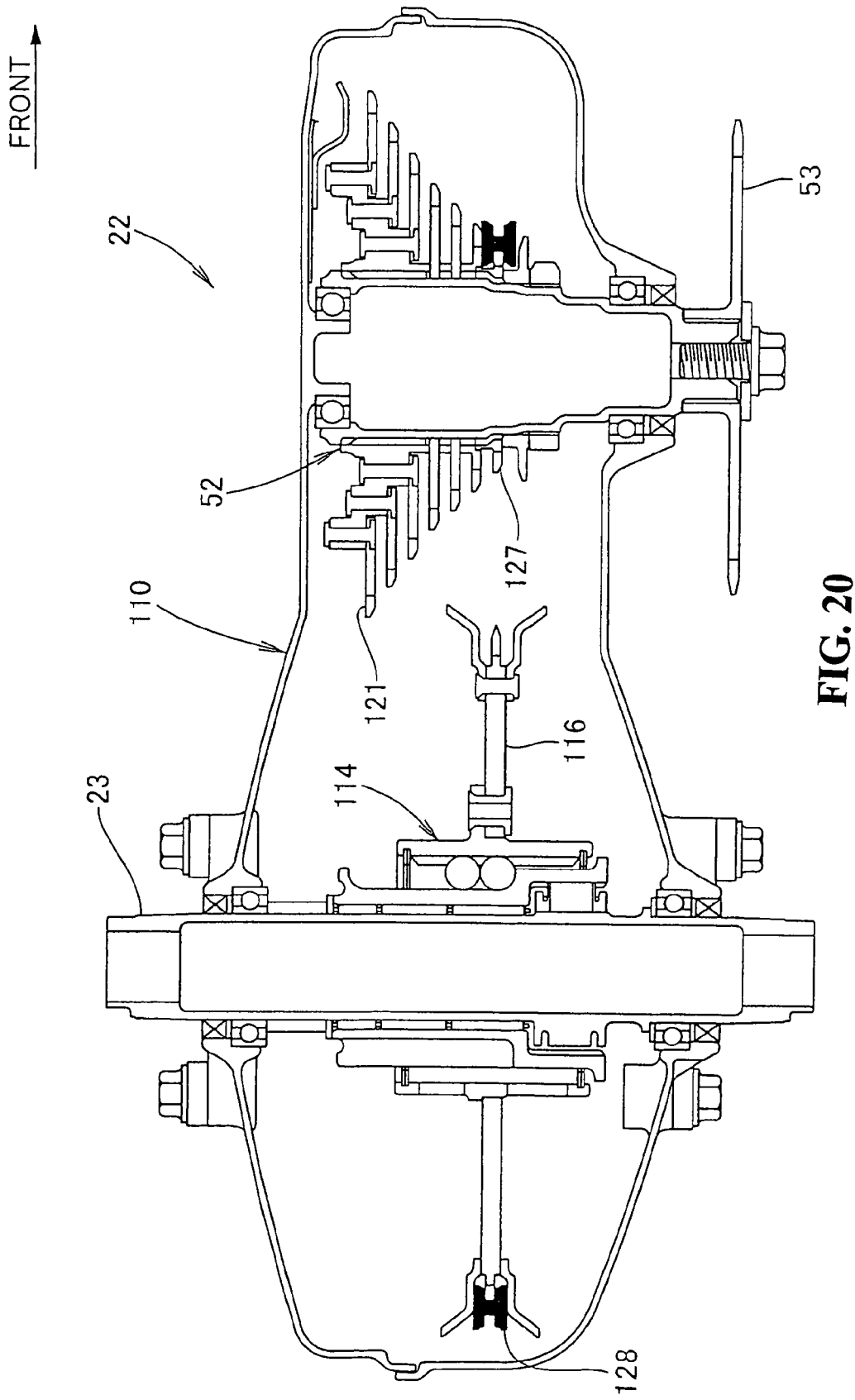
FIG. 20 is a forth operational view showing the manner of operation of the transmission according to the present invention.

FIG. 20 is a fourth operational view showing the manner of operation of the transmission according to the present invention. When the winding of the transmission chain 128 (here, matted in black to facilitate the understanding of the position)

is changed from the transmission chain 121 side to the transmission chain 127 in the state shown in FIG. 7, the large sprocket wheel 116 is moved from the left side to the right side in the inside of the case 110 due to an action of the slide mechanism 114 along the crankshaft 23 in the inside of the case 110 along with such a change of the chain winding.

Figure 21:
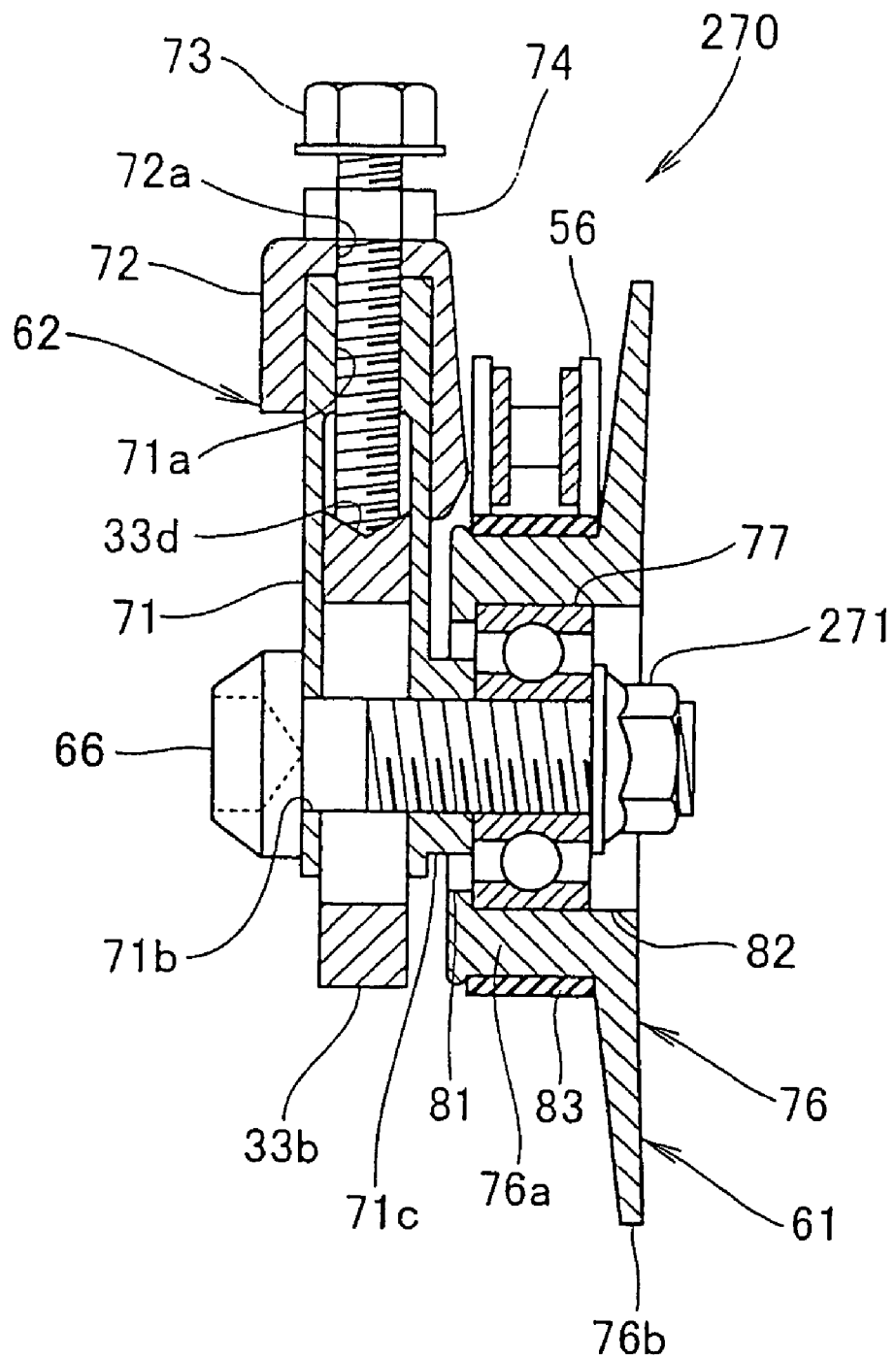
FIG. 21 is a cross-sectional view showing another embodiment of the chain tension adjusting unit according to the present invention.
Figure 22A:
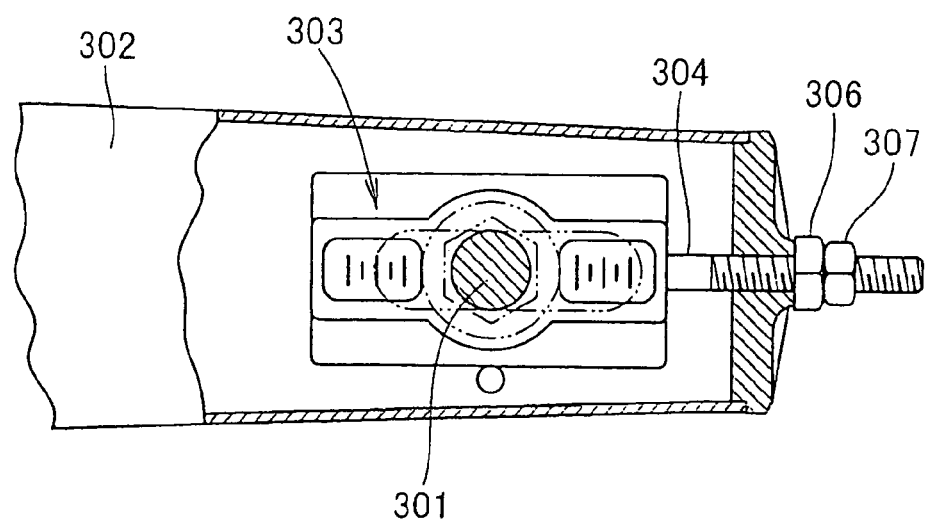
FIGS. 22(a), 22(b) and 22(c) are explanatory views showing the conventional chain tension structure.
Figure 22B:
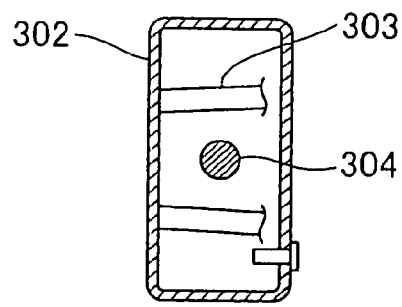
Figure 22C:
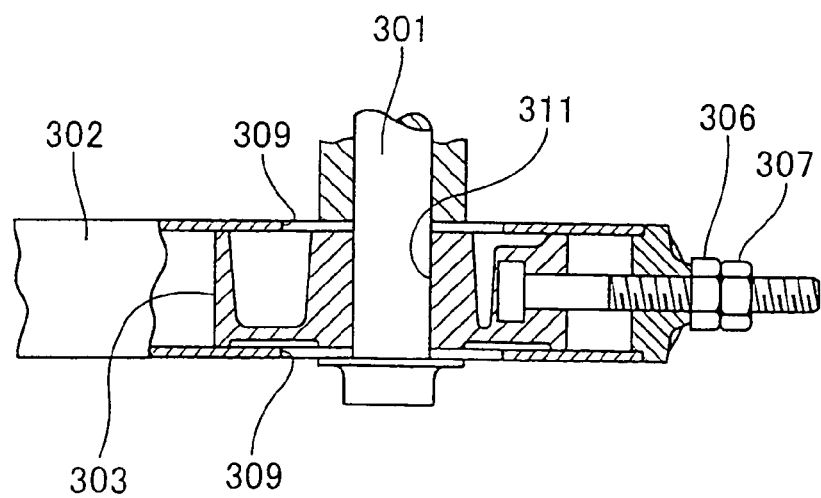

FIG. 21 is a cross-sectional view showing another embodiment of the chain tension adjusting unit according to the present invention. In FIG. 21, with respect to constitutions identical with the construction of the embodiment shown in FIG. 3(b), the same numbers are given to this construction and their detailed explanation is omitted.

The chain tension adjusting unit 270 includes a mounting nut 271 that is threadedly mounted on a distal end of a hexagon socket head cap screw 66. A tension roller 61 is mounted on a tension roller moving mechanism 62 using the mounting nut 271.

By eliminating the sealing structure of the bearing 77, it is possible to manufacture the chain tension adjusting unit 270 at a low cost.

As has been explained in conjunction with FIG. 1 to FIG. 3(b), the present invention is, first of all, directed to the chain tension structure in which the chain 56 is wound around the drive sprocket wheel 53 which is arranged below the vehicle body frame 11 and the driven sprocket wheel 55 which is mounted on the rear wheel 18 side and the tension is imparted to the chain 56 by the tension roller 61, wherein the improvement includes the tension roller 61 that is mounted in a state wherein the hexagon socket head cap screw 66 which constitutes the rotary shaft thereof is inserted into the elongated hole 33c which is opened in the plate-like projecting portion 33b which constitutes the bracket formed on the vehicle body frame 11.

The position of the tension roller 61 can be adjusted by moving the hexagon socket head cap screw 66 of the tension roller 61 along the elongated hole 33c of the plate-like projecting portion 33b. Thus, the adjustment of the tension of the chain 56 can be easily performed. In the conventional structure which provides an elongated hole for mounting an axle of a rear wheel in a rear end of a rear fork, for example, when a tension of a chain is adjusted, a distance between a front wheel and the rear wheel is changed or it is necessary to adjust axle positions respectively at left and right sides of the rear fork. Compared to such conventional structure, according to the present invention, the distance between the front wheel 14 and the rear wheel 18 is not changed. Thus, there is no possibility that the chain tension adjustment influences the traveling performance such as the turning performance of the downhill bicycle 10. Further, since the adjustment of the tension of the chain 56 can be performed at one place, the tension adjustment operation of the chain 56 can be simplified.

The present invention is secondly characterized in that the plate-like projecting portion 33b is arranged in front of the front end of the rear wheel 18 and is formed on the vehicle body frame 11, to be more specific, the rear surface 33a of the rear frame 33.

The plate-like projecting portion 33b and the tension roller 61 can be arranged close to the center of the vehicle body. Thus, it is possible to concentrate a mass at a position close to the vehicle body center whereby the turning performance of the downhill bicycle 10 can be enhanced. Further, it is possible to arrange the tension roller 61 in the relatively large space in front of the rear wheel 18 and in the vicinity of the rear surface 33a of the rear frame 33 whereby the chain tension adjusting operation using the tension roller 61 can be easily performed.

The present invention is thirdly characterized in that the tension roller 61 pushes the chain 56 from the position below the slackened side 56b.

Since the chain 56 is pushed from below the slackened side 56b thereof by the tension roller 61, it is possible to effectively impart the tension to the chain 56. Further, since the chain 56 is pushed from below to the above, the position of the intermediate portion of the chain 56 is elevated whereby it is possible to ensure the ground height.

Here, in this embodiment, as shown in FIG. 3(a), the plate-like projecting portion 33b is integrally formed with the rear frame 33, the present invention is not limited to such a structure and a plate-like projecting portion which constitutes another bracket may be mounted on the rear frame 33.

The chain tension structure of the present invention is preferably applicable to the downhill bicycle.

As has been explained in conjunction with FIG. 1, FIG. 4 and FIG. 5, the present invention is also directed to the drive force transmission unit structure of the downhill bicycle 10 in which the drive sprocket wheel 53 is mounted on the output shaft 52 which constitutes a support shaft. The hub 87 is rotatably mounted on the axle 54 of the rear wheel 18 which constitutes the drive wheel. The driven sprocket wheel 55 is mounted on the hub 87 by way of the one-way clutch 88 which constitutes the first one-way clutch with the chain 56, which constitutes the main chain, being wound around the drive sprocket wheel 53 and the driven sprocket wheel 55. The rear wheel 18 is rotated by transmitting the drive force to the output shaft 52 from the step-on pedals 27, 28 (only one symbol 28 shown in the drawing). The O ring 91 constitutes the frictional member for generating the frictional force that is interposed between the driven sprocket wheel 55 and the hub 87, and, at the same time, in parallel to the one-way clutch 88.

When a large load is not applied to the drive force transmission unit, for example, the hub 87, the driven sprocket wheel 55, the chain 56, the drive sprocket wheel 53, the transmission 22 and the like, the driven sprocket wheel 55 and the hub 87 can be integrally rotated by the frictional force of the O ring 91. Thus, when the downhill bicycle 10 travels with inertia, it is possible to perform the transmission by rotating the transmission chain 128 (see FIG. 6).

When a large load is applied to the drive force transmission unit, slipping is generated between the driven sprocket wheel 55 and the O ring 91 or between the hub 87 and the O ring 91, or between the driven sprocket 55 and the O ring 91 as well as between the hub 87 and the O ring 91. Thus, it is possible to prevent the excessively large load from being applied to respective parts of the drive force transmission unit.

The present invention, as has been explained in conjunction with FIG. 6, FIG. 10, FIG. 11 and FIG. 15, provides between the pedals 27, 28 (see FIG. 2 with respect to symbol 27) and the output shaft 52, the crankshaft 23 which is rotated by the pedals 27, 28, the large sprocket wheel 116 which constitutes the crankshaft-side sprocket wheel which is mounted on the crankshaft 23, the plurality of transmission sprocket wheels 121 to 127 having a different number of teeth which are mounted on the output shaft 52, the transmission chain 128 which is wound around the large sprocket wheel 116 and the transmission sprocket wheels 121 to 127, and the derailleur 131 which moves the transmission chain 128 in a sideward direction to change the winding of the transmission chain 128 with any one of the transmission sprocket wheels 121 to 127 which are all provided, wherein the large sprocket wheel 116 is mounted on the crankshaft 23 by way of the one-way clutch 113 which constitutes the second one-way clutch.

Since the transmission can be performed using the transmission sprocket wheels 121 to 127, the transmission chain 128 and the derailleur 131 and, at the same time, the large sprocket wheel 116 is mounted on the crankshaft 23 by way of the one-way clutch 113, even when the transmission chain 128 is rotated, the pedals 27, 28 are not rotated, whereby it is possible to make the posture of the downhill bicycle 10 stable in a state that the feet are placed on the pedals 27, 28 at the time of the inertia traveling of the downhill bicycle 10 (see FIG. 1).

The present invention, as explained in conjunction with FIG. 4, includes the frictional member which is constituted of the O ring 91, the O ring 91 is arranged in the axial direction of the axle 54 and on one side of the one-way clutch 88. The removal prevention cap 93 constitutes the cap member which covers the side surface of the hub 87 and is arranged on another side of the one-way clutch 88.

Since the O ring 91 is arranged in the axial direction of the axle 54 and on one side of the one-way clutch 88 and the removal prevention cap 93 is arranged on another side, it is possible to seal both sides of the one-way clutch 88 with the O ring 91 and the removal prevention cap 93 whereby it is possible to prevent dusts, muddy water and the like from being applied to the one-way clutch 88.

Figure 23:
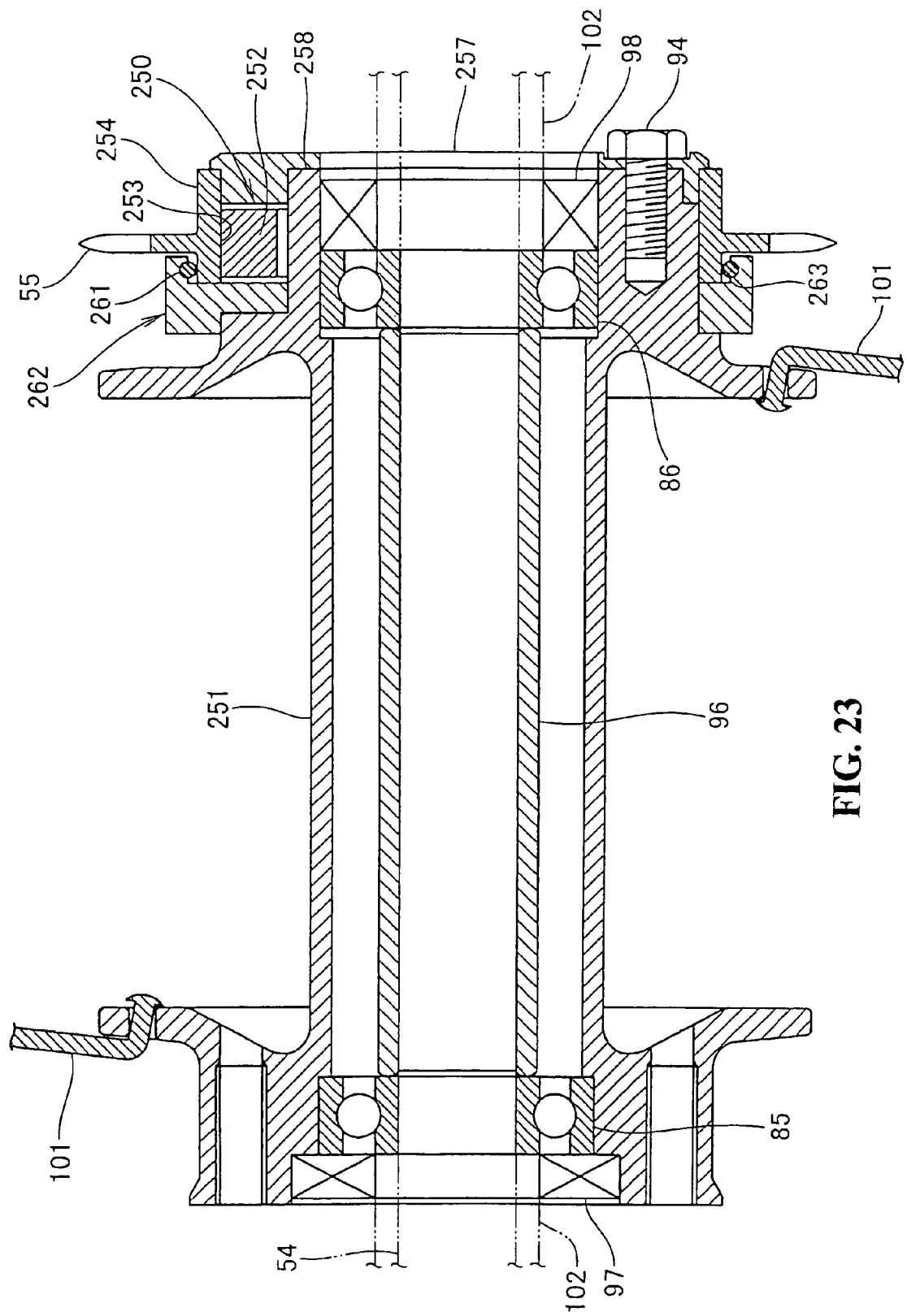
FIG. 23 is a cross-sectional view showing another embodiment of an essential part of the drive force transmission unit to the rear wheel according to the present invention.
Figure 24:
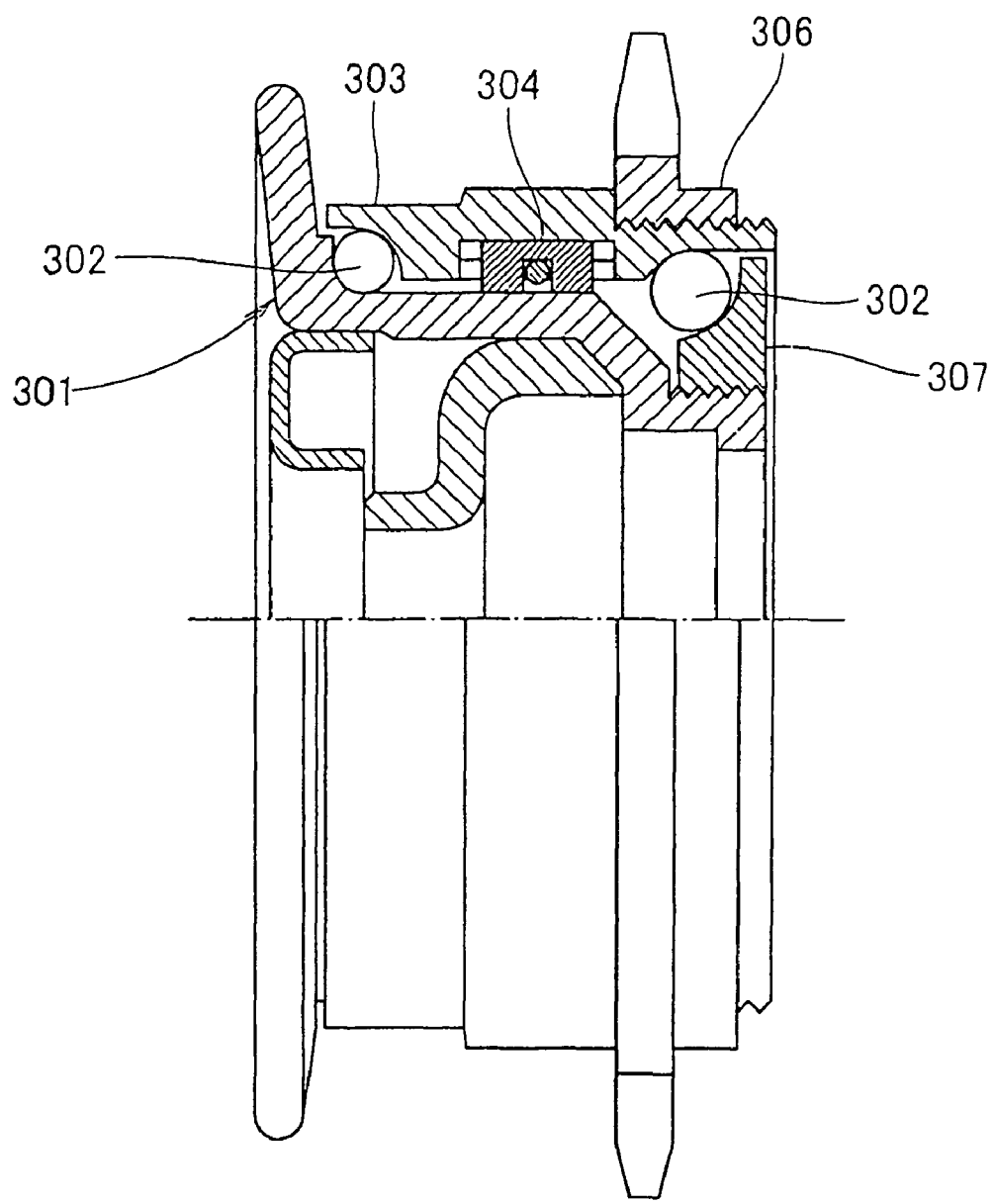
FIG. 24 is a cross-sectional view showing a drive force transmission unit structure of a conventional vehicle.

FIG. 23 is a cross-sectional view showing another embodiment of an essential part of the drive force transmission unit to the rear wheel according to the present invention. In the drawing, with respect to constitutions identical with the constitutions of the embodiment shown in FIG. 4, the same numerals are given to these constitutions and their detailed explanation is omitted.

A one-way clutch 250 includes a hub 251 which constitutes an inner clutch, a plurality of pawl members 252 which are radially swingably mounted on the hub 251, a cylindrical outer clutch 254 which forms a plurality of engaging recessed portions 253 wherein distal ends of the pawl members 252 are engaged on an inner peripheral surface thereof, and springs (not shown in the drawing) which bring the pawl member 252 into pressure contact with the engaging recessed portions 253 by a resilient force. The outer clutch 254 is integrally formed with a driven sprocket wheel 55. A removal prevention cap 257 is mounted on an end surface 258 of the hub 251 using a plurality of bolts 94 to prevent the outer clutch 254 from being removed from the hub 251.

An O ring 261 which constitutes a frictional member is interposed between an inner peripheral surface of a cylindrical member 262 which is integrally mounted on the hub 251. More specifically, an annular groove 263 which is formed on the inner peripheral surface and an outer peripheral surface of the outer clutch 254 in a state wherein the O ring 261 is compressed by the inner and outer peripheral surfaces, wherein the hub 251 and the outer clutch 254 can be rotated relative to each other only when an excessively large torque which exceeds a given torque acts thereon.

Here, in the embodiment of the present invention, as shown in FIG. 4, the 0 ring 91 which constitutes the frictional member is arranged in a state wherein the 0 ring 91 is sandwiched between the driven sprocket wheel 55 and the hub 87 in the radial direction. However, the present invention is not limited to such an embodiment and the O ring 91 may be arranged in a state wherein the O ring 91 is sandwiched in the axial direction of the axle 54 between the driven sprocket wheel and the hub. Further, the frictional member is not limited to the rubber-made O ring 91 and may be formed of a rubber-made or resin-made washer.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A chain tension structure comprising:
   a transmission including a sprocket wheel mounted on a crankshaft operatively connected to a drive sprocket wheel, the drive sprocket wheel being located forwardly with respect to the sprocket wheel;
   a chain wound around the drive sprocket wheel and a driven sprocket wheel mounted on a rear wheel side; and
   a tension roller for imparting tension to the chain,
   the tension roller being mounted on a rotary shaft inserted into an aperture which is opened in a bracket projecting rearwardly from a rear surface of a downwardly sloping rear frame of the vehicle body frame, and
   wherein the rotary shaft of the tension roller is offset to the rear surface of the downwardly sloping rear frame, and the sprocket wheel mounted on the crankshaft and the drive sprocket wheel are offset with respect to a front surface of the downwardly sloping rear frame.

2. A chain tension structure, comprising:
   a chain wound around a drive sprocket wheel which is arranged below a vehicle body frame and a driven sprocket wheel mounted on a rear end of a swing arm which is pivotably connected to a downwardly sloping rear frame the vehicle body frame via a pivot shaft; and
   a tension roller for imparting tension to a slackened side the chain from below;
   wherein the tension roller is mounted on the downwardly sloping rear frame of the vehicle body frame at a position below and to a rear of the pivot shaft.

3. The chain tension structure according to claim 1, wherein the tension roller has a cylindrical surface having a first diameter on a side thereof facing the bracket, and a single flange with a circular outer perimeter having a second diameter larger than the first diameter located exclusively on a side facing away from the bracket,
   wherein the cylindrical surface is adapted to push the chain from a position below a slackened side.

4. A chain tension structure, comprising:
   a chain wound around a drive sprocket wheel which is arranged forwardly of a downwardly sloping rear frame of a vehicle body frame and a driven sprocket wheel which is mounted on a rear end of a swing arm; and
   a tension roller for imparting tension to the chain;
   wherein the tension roller is mounted on a rotary shaft thereof that is inserted into an elongated aperture which is opened in a bracket projecting rearwardly from a central portion of the downwardly sloping rear frame, and
   wherein the swing arm includes a front end pivotably mounted to a downwardly sloping rear frame at a position between the tension roller and drive sprocket wheel in a longitudinal direction of the vehicle body frame.

5. The chain tension structure according to claim 1, wherein the bracket includes a plate-shaped projecting portion with the elongated aperture therein for enabling adjustment of the tension roller relative to the plate-shaped projecting portion.

6. The chain tension structure according to claim 5, and further including
   a mounting member having a inverted U-shaped cross-section for mounting on said plate-shaped projecting portion so as to cover at least a portion of both sides of the elongated aperture, a restricting member for restricting movement of the chain toward one side, and an adjusting bolt having a vertical axis for fixing the mounting member relative to the plate-shaped projecting portion.

7. The chain tension structure according to claim 6, wherein the adjusting bolt is threaded in said mounting member and being in engagement with an upper portion of said plate-shaped projecting portion.

8. The chain tension structure according to claim 1, wherein said rotary shaft includes a bearing mounted thereon and a sealing member for sealing an exposed side of said bearing, wherein a nut member on a distal end of the rotary shaft is adapted to secure the bearing within an inner peripheral surface of the tension roller.

9. The chain tension structure according to claim 1, wherein said rotary shaft includes a bearing mounted thereon and a sealing member for sealing an exposed side of said bearing, wherein a nut member on a distal end of the rotary shaft is adapted to secure the bearing within an inner peripheral surface of the tension roller, wherein the tension roller includes a cylindrical surface for supporting the chain, the chain tension structure further comprising:

a restricting member mounted on the bracket, the restricting member having a portion disposed directly between the bracket and the chain for restricting movement of the chain, in a lateral direction toward the bracket.

* * * * *